US011728497B2

(12) United States Patent
Song et al.

(10) Patent No.: US 11,728,497 B2
(45) Date of Patent: Aug. 15, 2023

(54) MULTI-STAGE REBALANCING REACTOR FOR REDOX FLOW BATTERY SYSTEM

(71) Applicant: ESS TECH, INC., Wilsonville, OR (US)

(72) Inventors: Yang Song, West Linn, OR (US); Craig E. Evans, West Linn, OR (US); Timothy J. McDonald, Portland, OR (US); Kenneth Fisher, Portland, OR (US); Sean Kissick, Portland, OR (US)

(73) Assignee: ESS TECH, INC., Wilsonville, OR (US)

( * ) Notice: Subject to any disclaimer, the term of this patent is extended or adjusted under 35 U.S.C. 154(b) by 333 days.

(21) Appl. No.: 17/081,695

(22) Filed: Oct. 27, 2020

(65) Prior Publication Data

US 2021/0143455 A1    May 13, 2021

Related U.S. Application Data

(60) Provisional application No. 62/933,000, filed on Nov. 8, 2019.

(51) Int. Cl.
*H01M 8/04* (2016.01)
*H01M 8/04276* (2016.01)
*H01M 8/18* (2006.01)
*H01M 8/04186* (2016.01)

(52) U.S. Cl.
CPC ... *H01M 8/04276* (2013.01); *H01M 8/04186* (2013.01); *H01M 8/188* (2013.01)

(58) Field of Classification Search
CPC ......... H01M 8/04276; H01M 8/04186; H01M 8/188
See application file for complete search history.

(56) References Cited

U.S. PATENT DOCUMENTS

| 4,159,366 | A | 6/1979 | Thaller |
| 10,181,615 | B2 | 1/2019 | Song et al. |
| 2014/0272483 | A1 | 9/2014 | Pham et al. |
| 2015/0104724 | A1 | 4/2015 | Chang et al. |
| 2015/0255824 | A1 | 9/2015 | Evans et al. |
| 2016/0293992 | A1* | 10/2016 | Song .................. H01M 8/188 |
| 2018/0269515 | A1* | 9/2018 | Wang ............... H01M 8/04925 |
| 2018/0316035 | A1 | 11/2018 | Song et al. |
| 2019/0097253 | A1 | 3/2019 | Song et al. |

OTHER PUBLICATIONS

ISA Korean Intellectual Property Office, International Search Report and Written Opinion Issued in Application No. PCT/US2020/056713, dated Feb. 16, 2021, WIPO, 11 pages.

* cited by examiner

*Primary Examiner* — Olatunji A Godo
(74) *Attorney, Agent, or Firm* — McCoy Russell LLP

(57) ABSTRACT

A rebalancing reactor for a redox flow battery system may include a plurality of reactor vessels arranged in stages, each vessel of the plurality of reactor vessels housing a catalyst bed. In one example, the rebalancing reactor is fluidly coupled to an electrolyte storage tank and configured to flow electrolyte through the plurality of reactor vessels, enabling a chemical rebalancing of electrolyte in the redox flow battery cell.

20 Claims, 12 Drawing Sheets

FIG. 11

MULTI-STAGE REBALANCING REACTOR FOR REDOX FLOW BATTERY SYSTEM

CROSS-REFERENCE TO RELATED APPLICATIONS

The present application claims priority to U.S. Provisional Application No. 62/933,000, entitled "MULTI-STAGE REBALANCING REACTOR FOR REDOX FLOW BATTERY SYSTEM", and filed on Nov. 8, 2019. The entire contents of the above-listed application are hereby incorporated by reference for all purposes

BACKGROUND AND SUMMARY

Redox flow batteries store electrical energy in a chemical form and subsequently dispense the stored energy in an electrical form via a spontaneous reverse redox reaction. Conversion between the chemical and electrical energy occurs in a reactor cell. One issue with conventional redox flow batteries is that over time the electrolyte state of charge can become imbalanced, thereby decreasing battery capacity due to hydrogen generation from the electrolyte via side reactions. For example, hydrogen gas is emitted as an electrochemical byproduct during battery charging. As another example, in a hybrid redox flow battery, hydrogen gas is emitted as a byproduct of a corrosion reaction at a negative (plating) electrode. Because hydrogen gas production consumes protons instead of the electro-active material in the battery, hydrogen gas generation not only results in an electrolyte state of charge imbalance which reduces the battery capacity, but also a rise in electrolyte pH which can lead to electrolyte stability issues.

Electrolyte rebalancing methods and systems typically employ an auxiliary rebalancing cell (electrochemical or photochemical) to convert the hydrogen gas back to protons via an auxiliary electrochemical reaction. For example, Thaller (U.S. Pat. No. 4,159,366) discloses a redox flow system including an electrochemical rebalancing cell, where hydrogen gas evolved from the battery negative electrode flows through the rebalancing cell anode and positive electrolyte flows through the rebalancing cell cathode. Electrochemical reactions occurring at the electrodes of the rebalancing cell convert gaseous hydrogen back to protons, consume the imbalanced positive electrolyte, and rebalance the electrochemical capacity of the positive and negative electrolytes.

The inventors have recognized various issues with the above system. Namely, dimensions and an arrangement of the electrochemical rebalancing cell, or rebalancing reactor, may affect an efficiency of a catalyst bed of the rebalancing reactor. For example, rebalancing reactor performance may be reduced if a height of the catalyst bed of the rebalancing reactor is not maintained within a target height range and positioned according to a specific orientation within the rebalancing reactor housing. In other words, if the height of the catalyst bed is not controlled and the catalyst bed is randomly positioned within the housing of the rebalancing reactor, a reaction rate of the catalyst bed, and therefore a performance of the battery, may be degraded.

One approach that addresses the above issues is a redox flow battery system including an electrolyte storage tank configured to supply electrolyte to a battery cell of the redox flow battery system, and a multi-stage rebalancing reactor fluidly coupled to the electrolyte storage tank, wherein each stage of the multi-stage rebalancing reactor is fluidly coupled to at least one adjacent stage and each stage is formed of one or more individually housed reactor vessels, the one or more reactor vessels spaced apart from other reactor vessels within a same stage, aligned with a vertical axis, and configured to facilitate reduction of an ion and oxidation of a gas. In this way, electrolyte balance may be restored, thereby maintaining a capacity of the redox flow battery system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 11 is a second example of an electrolyte circuit of a redox flow battery, incorporating the first embodiment of the multi-stage rebalancing reactor.

DETAILED DESCRIPTION

Figure 1:
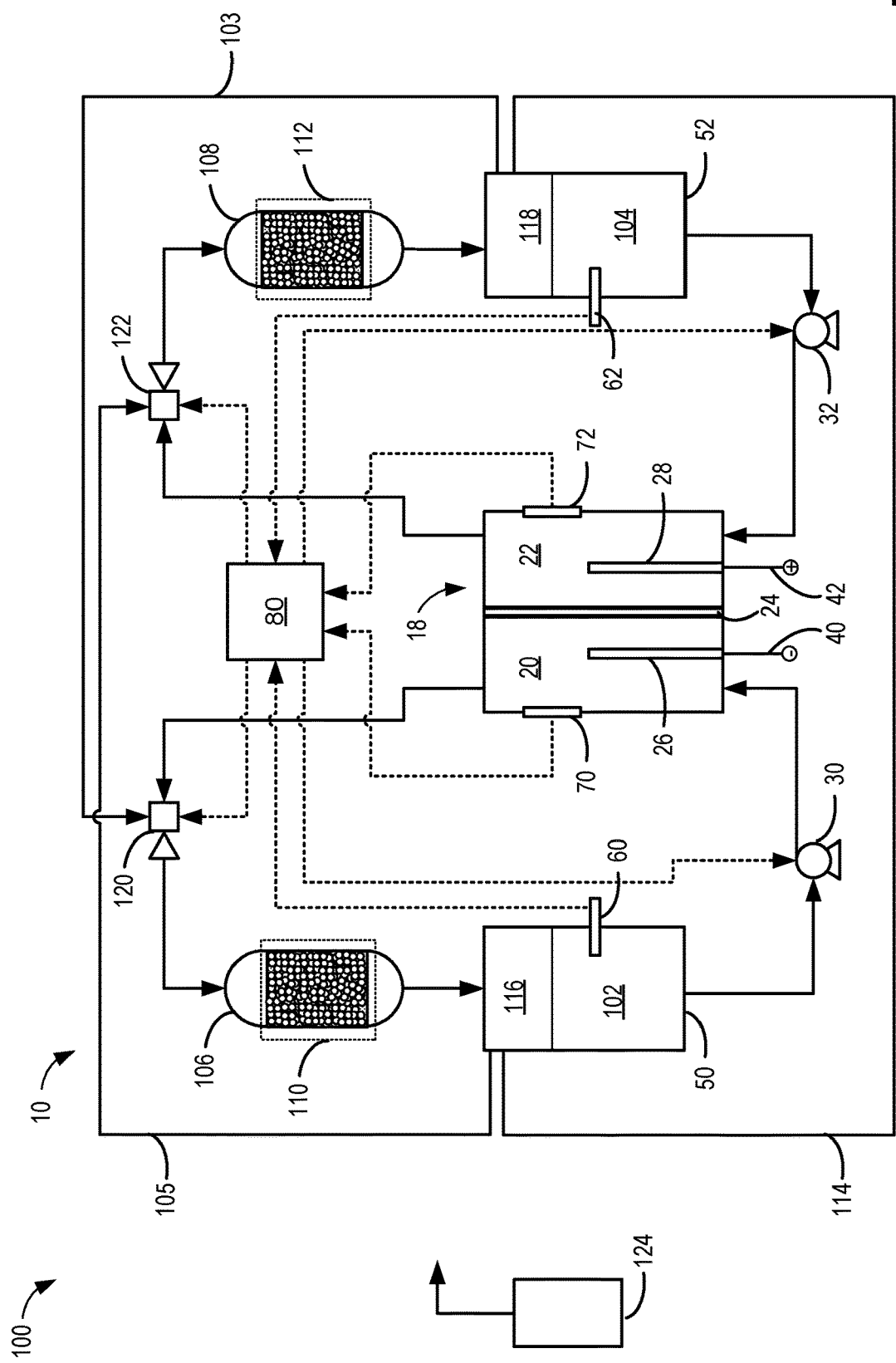
FIG. 1 is a schematic showing an example redox flow battery system adapted with an apparatus for rebalancing the redox flow battery system.
Figure 2:
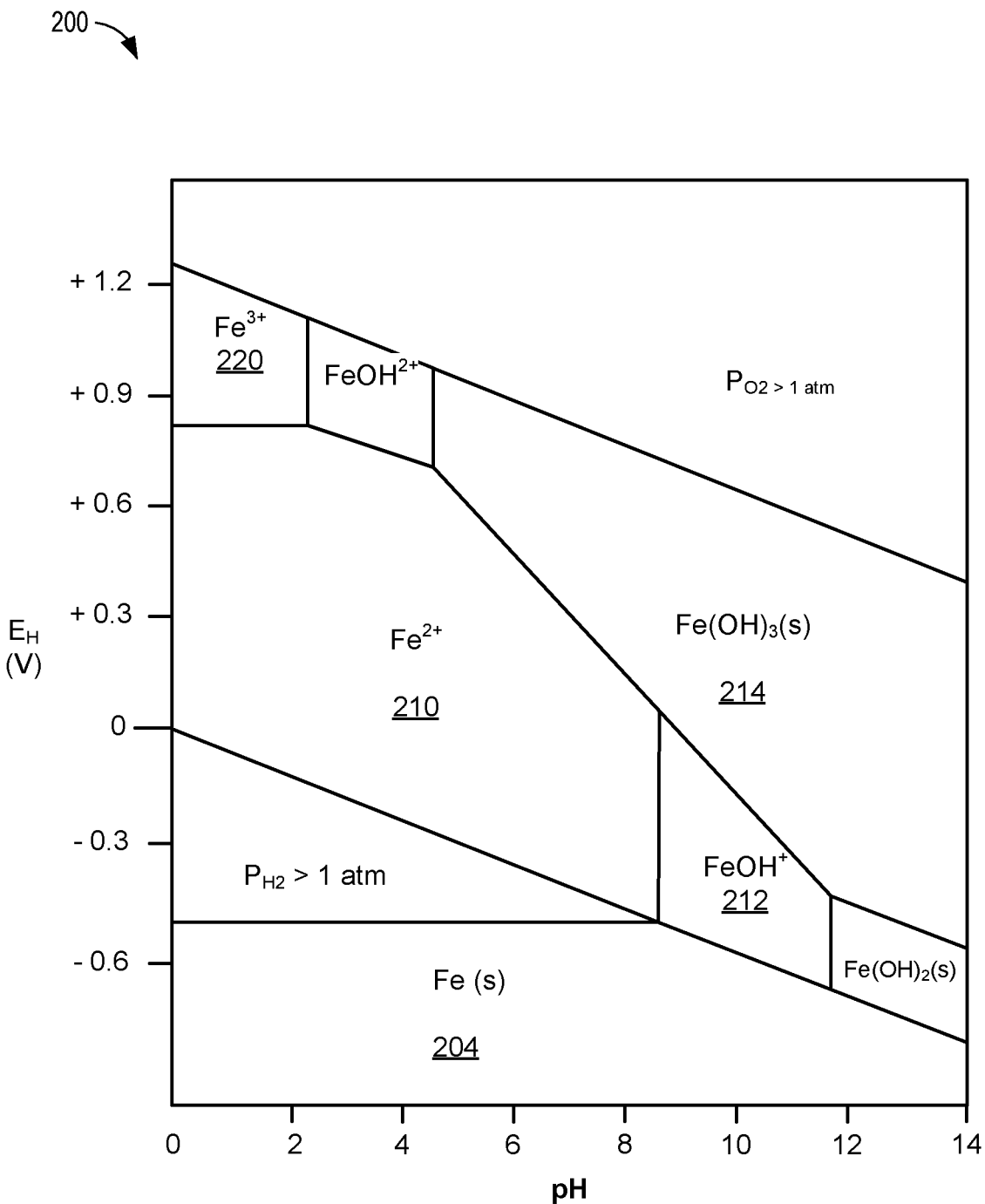
FIG. 2 is an example of a Pourbaix diagram illustrating stable regions of various iron species in aqueous solution.
Figure 3:
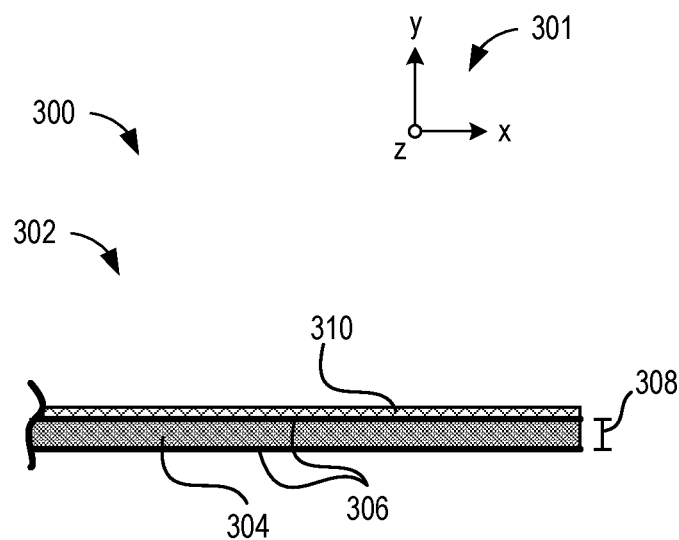
FIG. 3 is a schematic showing an example catalyst bed, including a substrate layer, a catalyst layer, and a spacing layer.
Figure 4:
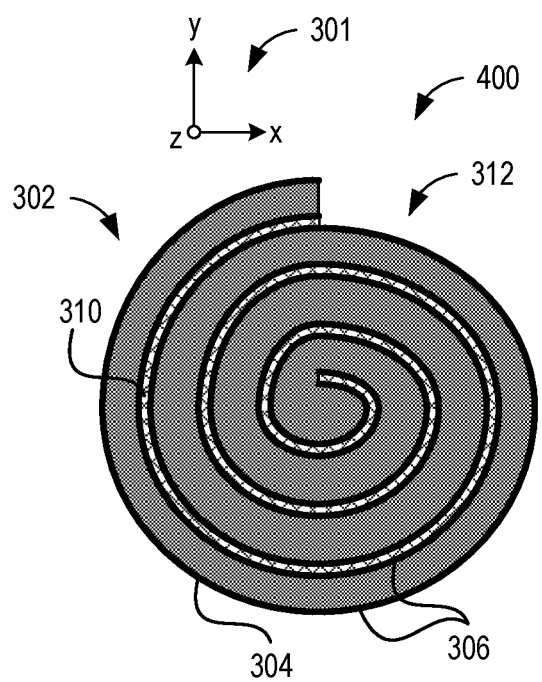
FIG. 4 is a schematic showing an end view of a jelly-roll catalyst bed formed by spiral winding the catalyst bed of FIG. 3.
Figure 6:
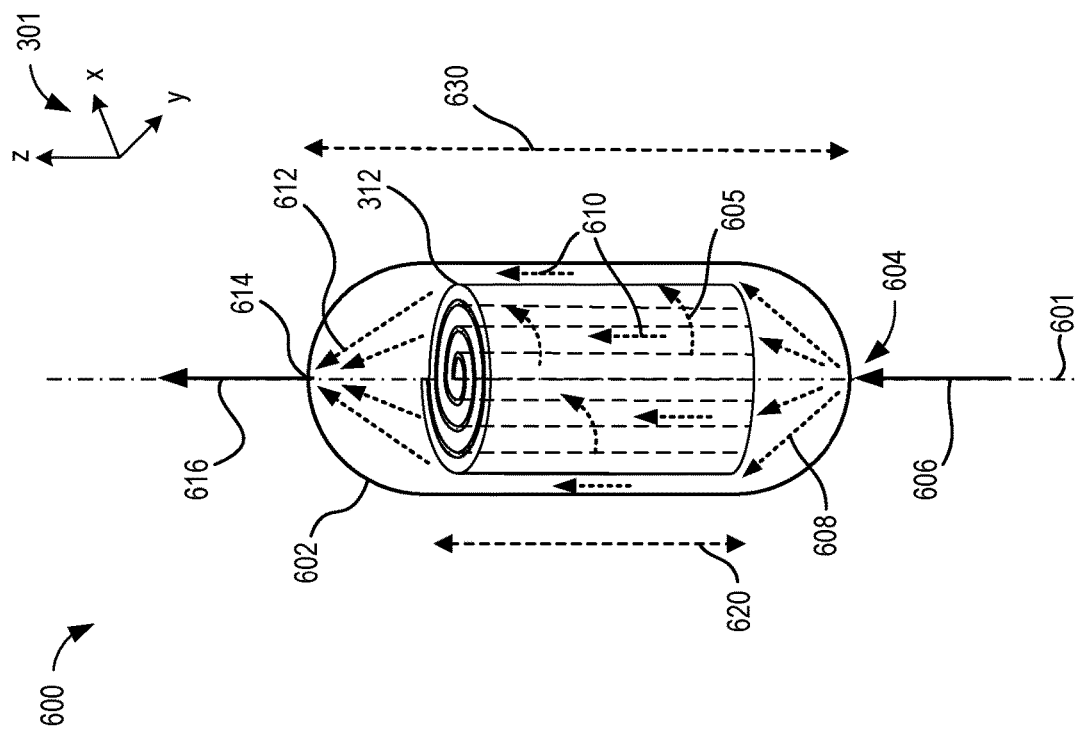
FIG. 6 is an example of a rebalancing reactor including the jelly-roll catalyst bed enclosed in a housing.
Figure 5:
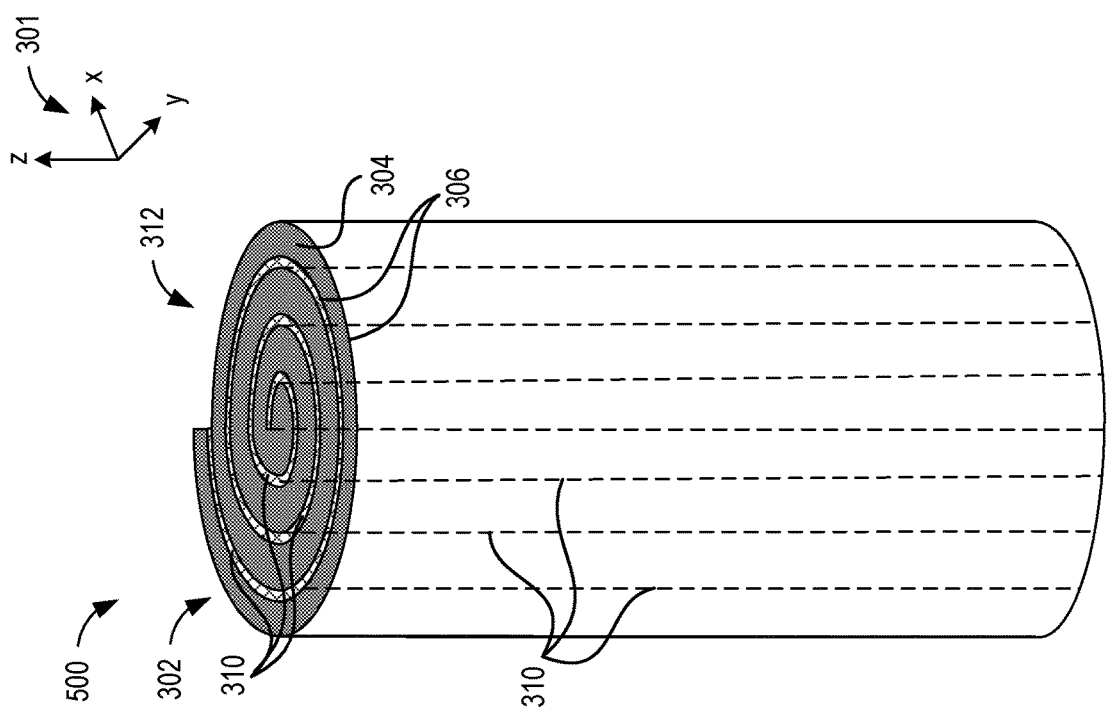
FIG. 5 is a schematic showing a perspective side view of a jelly-roll catalyst bed formed by coiling the catalyst bed of FIG. 3.
Figure 8:
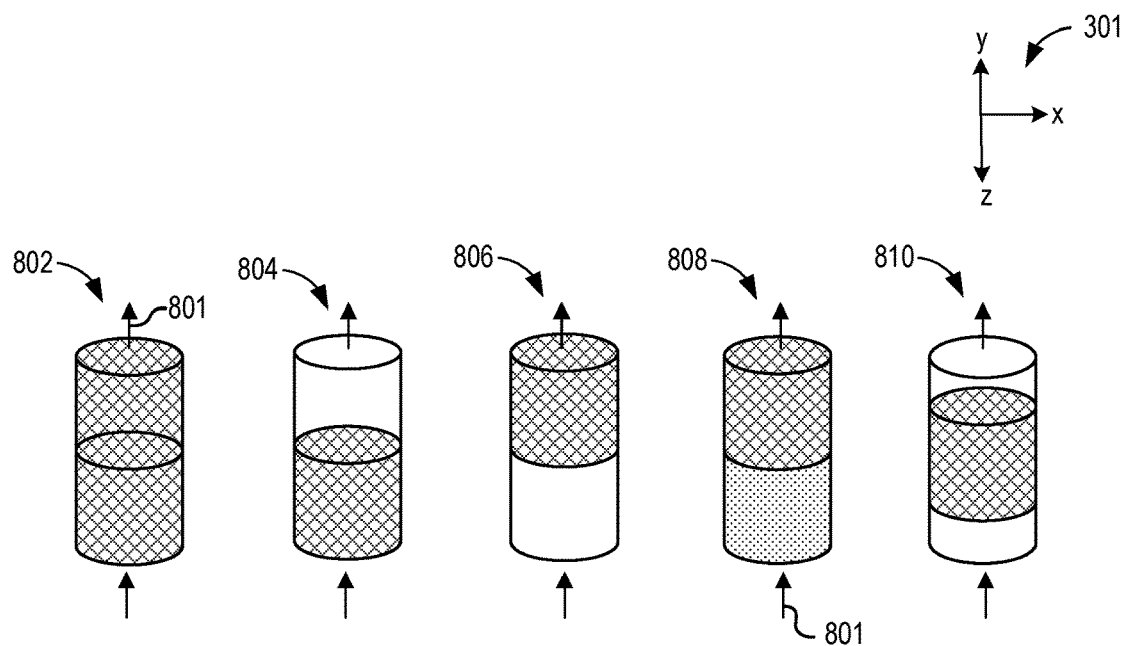
FIG. 8 is a diagram showing different positioning of one or more catalyst beds within a housing of a rebalancing reactor.
Figure 9:
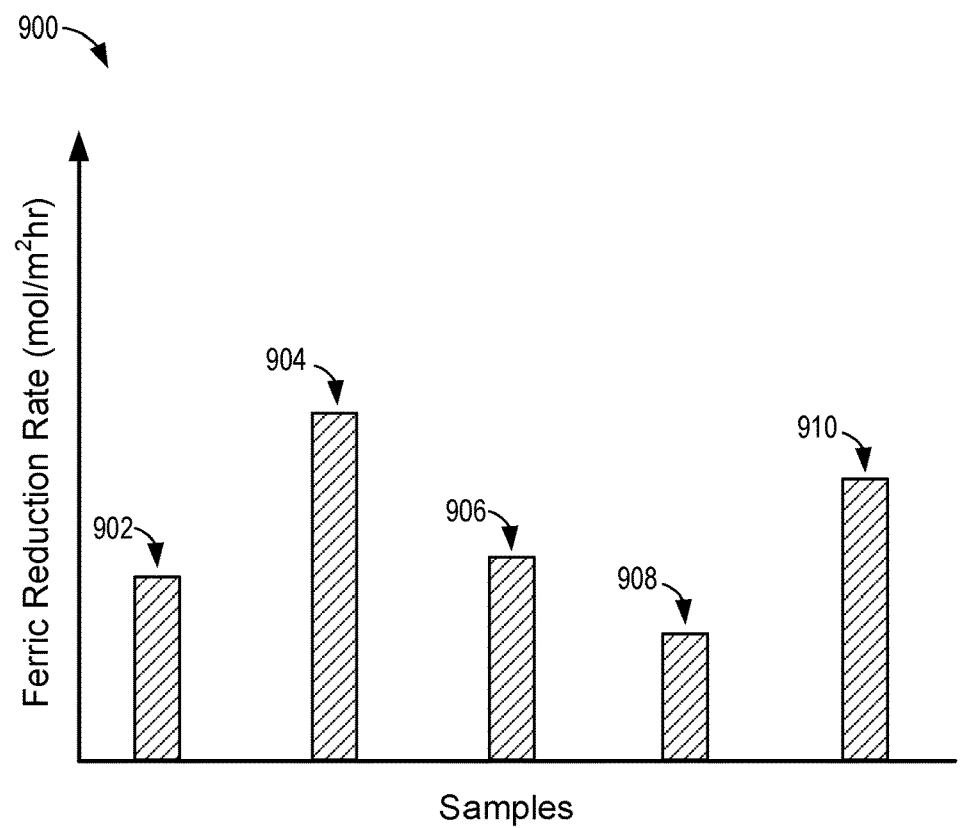
FIG. 9 is a bar graph depicting ferric ion reduction rate for each of the catalyst bed positions shown in FIG. 8.

The present description relates to methods and systems for rebalancing electrolytes in a redox flow battery system. The description primarily describes an all-iron hybrid redox flow battery (IFB) as an example redox flow battery system, however the methods and systems for rebalancing electrolytes disclosed in the present description also apply to other types of redox flow batteries (such as an iron/chromium redox flow battery system, for example). FIG. 1 illustrates an example schematic for a redox flow battery, including one or more rebalancing reactors for restoring a charge balance and a pH of positive and negative electrolyte. An effect of pH on equilibria of iron species in aqueous solution is illustrated in a Pourbaix diagram shown in FIG. 2. Electrolyte pH may be adjusted by flowing electrolyte to the one or more rebalancing reactors where the redox active species may undergo redox reactions at a catalyst bed of the one or more rebalancing reactors. An example of such a catalyst bed is shown in FIG. 3, which may be wound into a jelly-roll catalyst bed, as shown in FIGS. 4 and 5. The jelly-roll catalyst bed may be inserted into a housing of the one or more rebalancing reactors, as illustrated in FIG. 6, enabling electrolyte to flow across surfaces of the jelly-roll catalyst bed. A length, or height, of a catalyst bed, may affect a reactivity of the catalyst bed, as shown in a graph plotting ferric ion reduction rate versus reactor length in FIG. 7. In FIGS. 8 and 9, different positioning of one or more catalyst beds within a housing of a rebalancing reactor vessel is depicted, comparing reaction rates between the different positions. An overall efficiency of a rebalancing reactor may be increased by using short catalyst beds in multiple, fluidly coupled reactor vessels, the multiple reactor vessels forming a multi-stage rebalancing reactor. In FIGS. 10-14, different examples of electrolyte circuits, each incorporating a multi-stage rebalancing reactor, are illustrated. A routine for rebalancing electrolyte in a positive electrolyte and/or a negative electrolyte of an IFB system adapted with a multi-stage rebalancing reactor is shown in FIG. 15.

Referring now to FIG. 1, a schematic diagram 100 of a redox flow battery system 10 is described. The reduction-oxidation (redox) flow battery is an electrochemical storage device that stores energy in a chemical form and converts the stored chemical energy to an electrical form via spontaneous reversible redox reactions. The reaction in a flow battery is reversible, so conversely, the dispensed chemical energy can be restored by the application of an electrical current inducing the reverse redox reactions. A single redox flow battery cell 18 generally includes a negative electrode compartment 20, a separator 24, and a positive electrode compartment 22. The negative electrode compartment 20 may comprise a negative electrode 26, and a negative electrolyte 102 comprising electro-active materials. The positive electrode compartment 22 may comprise a positive electrode 28, and a positive electrolyte 104 comprising electro-active materials. In some examples, multiple cells 18 may be combined in series or parallel to create a higher voltage or current in a redox flow battery system. Electrolytes are typically stored in tanks external to the cell 18, and are pumped via pumps 30 and 32 through the negative electrode compartment 20 side and the positive electrode compartment 22 side of the battery, respectively. In the example of FIG. 1, the positive electrolyte 104 is stored at a positive electrolyte source 52, which may comprise an external positive electrolyte tank, and the negative electrolyte 102 is stored at a negative electrolyte source 50, which may comprise a second external tank. The separator 24 may comprise an electrically insulating ionic conducting barrier which prevents bulk mixing of the positive electrolyte 104 and the negative electrolyte 102 while allowing conductance of specific ions therethrough. For example, the separator 24 may comprise an ion-exchange membrane or a microporous membrane.

When a charge current is applied to the battery terminals 40 and 42, the positive electrolyte 104 is oxidized (lose one or more electrons) at the positive electrode 28, and the negative electrolyte 102 is reduced (gain one or more electrons) at the negative electrode 26. During battery discharge, reverse redox reactions occur on the electrodes. In other words, the positive electrolyte 104 is reduced (gain one or more electrons) at the positive electrode 28, and the negative electrolyte 102 is oxidized (lose one or more electrons) at the negative electrode 26. The electrical potential difference across the battery is maintained by the electrochemical redox reactions in the positive electrode compartment 22 and the negative electrode compartment 20, and can induce a current through a conductor while the reactions are sustained. The amount of energy stored by a redox battery is limited by the amount of electro-active material available in electrolytes for discharge, depending on the total volume of electrolytes and the solubility of the electro-active materials.

During operation of a redox flow battery system, sensors and probes may monitor and control chemical properties of the electrolyte such as electrolyte pH, concentration, state of charge, and the like. For example, sensors 62 and 60 may be positioned to monitor positive electrolyte and negative electrolyte conditions at the positive electrolyte source 52 and the negative electrolyte source 50, respectively. As another example, sensors 72 and 70 may monitor positive electrolyte and negative electrolyte conditions at the positive electrode compartment 22 and the negative electrode compartment 20, respectively. Sensors may be positioned at other locations throughout the redox flow battery system to monitor electrolyte chemical properties and other properties. For example, a sensor may be positioned in an external acid tank (not shown) to monitor acid volume or pH of the external acid tank, wherein acid from the external acid tank is supplied via an external pump (not shown) to the redox flow battery system in order to reduce precipitate formation in the electrolytes. Additional external tanks and sensors may be installed for supplying other additives to the redox flow battery system. Sensor information may be transmitted to a controller 80 which may in turn actuate pumps 30 and 32 to control electrolyte flow through the cell 18, or to perform other control functions, as an example. In this way, the controller 80 may be responsive to one or a combination of sensors and probes.

Hybrid flow batteries are redox flow batteries that are characterized by the deposit of one or more of the electro-active materials as a solid layer on an electrode. Hybrid batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid battery systems, the charge capacity (e.g., amount of energy stored) of the redox battery may be limited by the amount of metal plated during battery charge and may accordingly depend on the efficiency of the plating system as well as the available volume and surface area available for plating.

In a hybrid flow battery system the negative electrode 26 may be referred to as the plating electrode and the positive electrode 28 may be referred to as the redox electrode. The negative electrolyte 102 within the plating side (e.g., negative electrode compartment 20) of the battery may be referred to as the plating electrolyte and the positive electrolyte 104 on the redox side (e.g. positive electrode compartment 22) of the battery may be referred to as the redox electrolyte.

Anode refers to the electrode where electro-active material loses electrons and cathode refers to the electrode where electro-active material gains electrons. During battery charge, the positive electrolyte 104 gains electrons at the negative electrode 26; therefore the negative electrode 26 is the cathode of the electrochemical reaction. During discharge, the positive electrolyte 104 loses electrons; therefore the negative electrode 26 is the anode of the reaction. Accordingly, during charge, the negative electrolyte 102 and negative electrode 26 may be respectively referred to as the catholyte and cathode of the electrochemical reaction, while the positive electrolyte 104 and the positive electrode 28 may be respectively referred to as the anolyte and anode of the electrochemical reaction. Alternatively, during discharge, the negative electrolyte 102 and negative electrode 15 may be respectively referred to as the anolyte and anode of the electrochemical reaction, while the positive electrolyte 104 and the positive electrode 28 may be respectively referred to as the catholyte and cathode of the electrochemical reaction.

For simplicity, the terms positive and negative are used herein to refer to the electrodes, electrolytes, and electrode compartments in redox battery flow systems.

One example of a hybrid redox flow battery is an all iron redox flow battery (IFB), in which the electrolyte comprises iron ions in the form of iron salts (e.g., $FeCl_2$, $FeCl_3$, and the like), wherein the negative electrode comprises metal iron. For example, at the negative electrode 26, ferrous ion, $Fe^{2+}$, receives two electrons and plates as iron metal on to the negative electrode 26 during battery charge, and iron metal, $Fe^0$, loses two electrons and re-dissolves as $Fe^{2+}$ during battery discharge. At the positive electrode 28, $Fe^{2+}$ loses an electron to form ferric ion, $Fe^{3+}$, during charge, and during discharge $Fe^{3+}$ gains an electron to form $Fe^{2+}$: The electrochemical reaction is summarized in equations (1) and (2), wherein the forward reactions (left to right) indicate electrochemical reactions during battery charge, while the reverse reactions (right to left) indicate electrochemical reactions during battery discharge:

$$Fe^{2+}+2e^- \leftrightarrow Fe^0 \; -0.44 \text{ V (Negative Electrode)} \quad (1)$$

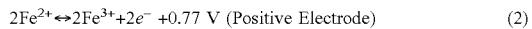
$$2Fe^{2+} \leftrightarrow 2Fe^{3+}+2e^- \; +0.77 \text{ V (Positive Electrode)} \quad (2)$$

As discussed above, the negative electrolyte 102 used in the all iron redox flow battery (IFB) may provide a sufficient amount of $Fe^{2+}$ so that, during charge, $Fe^{2+}$ can accept two electrons from the negative electrode 26 to form $Fe^0$ and plate onto a substrate. During discharge, the plated $Fe^0$ may then lose two electrons, ionizing into $Fe^{2+}$ and be dissolved back into the negative electrolyte 102. The equilibrium potential of the above reaction is −0.44V and thus this reaction provides a negative terminal for the desired system. On the positive side of the IFB, the positive electrolyte 104 may provide $Fe^{2+}$ during charge which loses electron and oxidizes to $Fe^{3+}$. During discharge, $Fe^{3+}$ provided by the positive electrolyte 104 becomes $Fe^{2+}$ by absorbing an electron provided by the positive electrode 28. The equilibrium potential of this reaction is +0.77V, creating a positive terminal for the desired system.

The IFB provides the ability to charge and recharge its electrolytes in contrast to other battery types utilizing non-regenerating electrolytes. Charge is achieved by applying a current across the electrodes via terminals 40 and 42. The negative electrode 26 may be coupled via terminal 40 to the negative side of a voltage source so that electrons may be delivered to the negative electrolyte 102 via the positive electrode 28 (e.g., as $Fe^{2+}$ is oxidized to $Fe^{3+}$ in the positive electrolyte 104 in the positive electrode compartment 22). The electrons provided to the negative electrode 26 (e.g., plating electrode) can reduce the $Fe^{2+}$ in the negative electrolyte 102 to form $Fe^0$ at the plating substrate causing it to plate onto the negative electrode 26.

Discharge can be sustained while $Fe^0$ remains available to the negative electrolyte 102 for oxidation and while $Fe^{3+}$ remains available in the positive electrolyte 104 for reduction. As an example, $Fe^{3+}$ availability can be maintained by increasing the concentration or the volume of the positive electrolyte 104 to the positive electrode compartment 22 side of cell 18 to provide additional $Fe^{3+}$ ions via an external source, such as an external positive electrolyte tank 52. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{3+}$ in the negative electrode compartment 20. As an example, $Fe^{2+}$ availability can be maintained by providing additional $Fe^{2+}$ ions via an external source, such as an external negative electrolyte tank 50 to increase the concentration or the volume of the negative electrolyte 102 to the negative electrode compartment 20 side of cell 18.

In an IFB, the positive electrolyte 104 comprises ferrous ion, ferric ion, ferric complexes, or any combination thereof, while the negative electrolyte 102 comprises ferrous ion or ferrous complexes, depending on the state of charge of the IFB system. As previously mentioned, utilization of iron ions in both the negative electrolyte 102 and the positive electrolyte 104 allows for utilization of the same electrolytic species on both sides of the battery cell, which can reduce electrolyte cross-contamination and can increase the efficiency of the IFB system, resulting in less electrolyte replacement as compared to other redox flow battery systems.

Efficiency losses in an IFB may result from electrolyte crossover through the separator 24 (e.g., ion-exchange membrane barrier, micro-porous membrane, and the like). For example, ferric ions in the positive electrolyte 104 may be driven toward the negative electrolyte 102 by a ferric ion concentration gradient and an electrophoretic force across the separator. Subsequently, ferric ions penetrating the membrane barrier and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) can result in precipitation of $Fe(OH)_3$. Precipitation of $Fe(OH)_3$ can damage the separator 24 and cause permanent battery performance and efficiency losses. For example, $Fe(OH)_3$ precipitate may chemically foul the organic functional group of an ion-exchange membrane or physically clog the small micro-pores of an ion-exchange membrane. In either case, due to the $Fe(OH)_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, adding to process cost and complexity. As another option, adding specific organic acids to the positive electrolyte 104 and the negative electrolyte 102 in response to electrolyte pH changes may assist in mitigating precipitate formation during battery charge and discharge cycling.

Additional coulombic efficiency losses may be caused by reduction of H$^+$ (e.g., protons) and subsequent formation of H$_2$ (e.g., hydrogen gas), and the reaction of protons in the negative electrode compartment 20 with electrons supplied at the plated iron metal electrode to form hydrogen gas.

The IFB electrolyte (e.g., FeCl$_2$, FeCl$_3$, FeSO$_4$, Fe$_2$(SO$_4$)$_3$, and the like) is readily available and can be produced at low costs. The IFB electrolyte offers higher reclamation value because the same electrolyte can be used for the negative electrolyte 102 and the positive electrolyte 104, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries.

Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

A performance of the IFB is affected by electrolyte stability during IFB operation. For example, variations in electrolyte pH may shift chemical equilibria of iron species in the electrolyte. Turning now to FIG. 2, it illustrates an example of a Pourbaix diagram. A Pourbaix diagram maps out possible stable equilibrium phases of an aqueous electrochemical system. The various solid lines in the Pourbaix diagram of FIG. 2 represent equilibrium conditions where the indicated species on either side of the line have the same chemical activity. Inside the regions on either side of the solid lines, the corresponding species predominates. In this way, Pourbaix diagrams can illustrate how pH changes can affect electrolyte species and stability in a redox flow battery system such as an IFB, leading to cycling performance losses over time.

As an example, FIG. 2 shows a Pourbaix diagram 200 for iron. The vertical axis of FIG. 2 represents the potential with respect to the standard hydrogen electrode, while pH is represented on the horizontal axis. During charge of an IFB, for example, ferrous ion, Fe$^{2+}$, is reduced (accepts two electrons in a redox reaction) to metal iron, Fe$^0$, at the negative electrode. Simultaneously, at the positive electrode, ferrous ion, Fe$^{2+}$, is oxidized (loss of an electron) to ferric ion, Fe$^{3+}$. Concurrently, at the negative electrode, the ferrous iron reduction reaction competes with the reduction of protons, H$^+$, wherein two protons each accept a single electron to form hydrogen gas, H$_2$ and the corrosion of iron metal to produce ferrous ion, Fe$^{2+}$. The production of hydrogen gas through reduction of hydrogen protons and the corrosion of iron metal are shown in equations (3) and (4), respectively:

$$H^+ + e^- \leftrightarrow \tfrac{1}{2}H_2 \text{ (proton reduction)} \qquad (3)$$

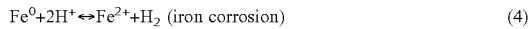

$$Fe^0 + 2H^+ \leftrightarrow Fe^{2+} + H_2 \text{ (iron corrosion)} \qquad (4)$$

As a result, a negative electrolyte in a negative electrode compartment (e.g., the negative electrolyte 102 and the negative electrode compartment 20 of FIG. 1) tends to stabilize at a pH range between 3 and 6, where Fe$^{2+}$ is stable at 210 and where formation of ferrous hydroxide ion (FeOH$^+$) at 212, precipitation of ferric hydroxide, Fe(OH)$_3$ at 214, and hydrogen evolution at 204 are all reduced. At a positive electrode compartment (e.g., the positive electrode compartment 22 of FIG. 1), ferric ion, Fe$^{3+}$, has a much lower acid disassociation constant (pKa) than that of ferrous ion, Fe$^{2+}$. Therefore, as more ferrous ions are oxidized to ferric ions, a positive electrolyte (e.g., the positive electrolyte 104 of FIG. 1) tends to stabilize at a pH less than 2, in particular at a pH closer to 1 within region 220.

Accordingly, maintaining the positive electrolyte pH in a first range in which the positive electrolyte (in the positive electrode compartment) remains stable and maintaining the negative electrolyte pH in a second range in which the negative electrolyte (in the negative electrode compartment) remains stable may reduce low cycling performance and increase efficiency of redox flow batteries. For example, maintaining the pH of the negative electrolyte in an IFB between 3 and 4 may reduce iron corrosion reactions and increase iron plating efficiency, while maintaining the pH of the positive electrolyte less than 2, in particular less than 1, may promote the ferric/ferrous ion redox reaction and reduce ferric hydroxide formation.

As indicated by equation (3) and (4), evolution of hydrogen can cause electrolyte imbalance in a redox flow battery system. For example, during charge, electrons flowing from the positive electrode to the negative electrode (e.g., as a result of ferrous ion oxidation), may be consumed by hydrogen evolution via equation (3), thereby reducing the electrons available for plating given by equation (1). Because of the reduced plating, battery charge capacity is reduced. Additionally, corrosion of the iron metal further reduces battery capacity since a decreased amount of iron metal is available for battery discharge. Thus, an imbalanced electrolyte state of charge between the positive electrode compartment and the negative electrode compartment can develop as a result of hydrogen production via reaction (3) and (4). Furthermore, hydrogen gas production resulting from iron metal corrosion and proton reduction both consume protons, which can result in a pH increase of the negative electrolyte. As discussed above with reference to FIG. 2, an increase in pH may destabilize the electrolyte in the redox batter flow system, resulting in further battery capacity and efficiency losses.

An approach that addresses the electrolyte rebalancing issues that can be caused by hydrogen gas production in redox flow battery systems comprises reducing the imbalanced ion in the positive electrolyte with hydrogen generated from the side reactions. As an example, in an IFB system, the positive electrolyte comprising ferric ion may be reduced by the hydrogen gas according to equation (5):

$$Fe^{3+} + \tfrac{1}{2}H_2 \rightarrow Fe^{2+} + H^+ \qquad (5)$$

In the IFB system example, by reacting ferric ion with hydrogen gas, the hydrogen gas can be converted back to protons, thereby maintaining a substantially constant pH in the negative electrode compartment and the positive electrode compartment. Furthermore, by converting ferric ion to ferrous ion, the state of charge of the positive electrolyte in the positive electrode compartment may be rebalanced with the state of charge of the negative electrolyte in the negative electrode compartment. Although equation (5) is written for rebalancing electrolytes in an IFB system, the method of reducing the electrolyte with hydrogen gas may be generalized by equation (6):

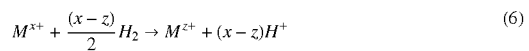

$$M^{x+} + \frac{(x-z)}{2}H_2 \rightarrow M^{z+} + (x-z)H^+ \qquad (6)$$

In equation (6), $M^{x+}$ represents the positive electrolyte M having ionic charge x, $M^{z+}$ represents the reduced electrolyte M having ionic charge z.

A catalyst comprising graphite or comprising supported precious metal (e.g., carbon-supported Pt, Rd, Ru, or alloys thereof) catalyst may increase the rate of reaction described by equation (5) for practical utilization in a redox flow battery system. As an example, hydrogen gas generated in the redox flow battery system may be directed to a catalyst surface, and hydrogen gas and electrolyte (e.g., comprising ferric ion) may be fluidly contacted at the catalyst surface, wherein the hydrogen gas chemically reduces the ferric ion to ferrous ion and produces positive hydrogen ions (e.g., protons). As described above, the catalyst surface may comprise graphite. In some examples, the reaction described by equation (5) may proceed at a faster rate when the catalyst comprises a precious metal-based catalyst, such as carbon-supported Pt, Rd, Ru, or alloys thereof. As an example, in cases where the partial pressure of hydrogen gas (e.g. hydrogen gas concentration) is high and when a slower rate of reaction can be tolerated, the less costly graphite catalyst may be used. On the other hand, a small amount (e.g., 0.2 to >0.5 wt %) of precious metal catalyst supported on carbon can increase the rate of reaction as compared to using a graphite catalyst. Different types of catalysts, such as Pt, Pd, Ru or alloys of the above, and the like, and different amounts (0.2 to >0.5 wt %) thereof can be utilized depending on a reaction speed for any specific battery system. Furthermore, alloys of the catalyst can be utilized to reduce cost and increase corrosion stability of the catalyst. For example, 10% addition of rhodium to platinum can reduce the corrosion of platinum by the ferric ion by over 98% (Handbook of Corrosion Data, Bruce D. Craig, David S. Anderson).

Returning to FIG. 1, positive electrolyte source 52 and negative electrolyte source 50 may each hold liquid electrolyte comprising positive electrolyte 104 and negative electrolyte 102, respectively. Positive electrolyte 104 may recirculate through the positive electrode compartment 22, and negative electrolyte 102 may recirculate to the negative electrode compartment 20. In the redox flow battery system 10, the positive electrolyte source 52 and the negative electrolyte source 50 may both purged with inert gas such as Ar to remove oxygen gas. The purged electrolytes may be pumped via pumps 32 and 30 through the positive and negative sides of the battery, respectively. The positive and negative sides of the battery may refer to the positive electrode compartment 22 and the negative electrode compartment 20. Two rebalancing reactors 106, 108 comprising catalyst beds 110, 112 respectively, may be connected in-line with the recirculating flow paths of the electrolyte at the negative and positive sides of the battery, respectively, in the redox flow battery system 10. In one example, the rebalancing reactors 106, 108 may be trickle bed reactors placed in the flow path of the positive and negative electrolyte sources 50 and 52. In other example redox flow battery systems, the rebalancing reactors 106, and 108 may be replaced with alternate types of redox reactor vessels with alternately-structured catalyst beds, such as reactor vessels with jelly-roll catalyst beds as shown in FIGS. 3-6 and described further below.

During battery charge, gaseous hydrogen may be generated on the negative side of the battery (e.g., at negative electrode 26) due to both electrochemical and corrosion side reactions (equations (3), and (4)) as previously described. Equation (4) is written for corrosion of iron metal electrode, for example in an IFB system, however, corrosion of other metals producing hydrogen gas may also occur in other types of hybrid redox flow battery systems or other redox flow battery systems. The hydrogen generated from the electrochemical and corrosion side reactions may accumulate at the negative electrolyte source 50 and the positive electrolyte source 52. A pressure equalization line 114 may connect negative source 50 and positive electrolyte source 52, thereby equating a pressure between gas head spaces 118 and 116 of positive and negative electrolyte sources, respectively. In this way, hydrogen gas may be distributed to the recirculating flow paths of the electrolyte at the negative and positive sides of the battery, respectively. In particular, the hydrogen gas may be supplied to the rebalancing reactors 106, 108. Ejectors 120 and 122 may be located between the outlet of the negative electrode compartment 20 and the positive electrode compartment 22 of battery cell 18 and rebalancing reactors 106 and 108, respectively.

Ejectors 120 and 122 may deliver a predetermined amount or flow rate of hydrogen gas to rebalancing reactors 106 and 108, respectively. Ejector 120 may be connected to the gas head space 118 of positive source 52 via gas line 103 and ejector 122 may be connected to the gas head space 116 of negative electrolyte source 50 via gas line 105. For example, negative electrolyte 102 flowing from the negative electrode compartment 20 may pass through ejector 120, thereby drawing gas (e.g., hydrogen gas) from gas head space 118 of positive electrolyte source 52, and positive electrolyte 104 flowing from the positive electrode compartment 22 may pass through ejector 122, thereby drawing gas (e.g., hydrogen gas) from gas head space 116 of negative electrolyte source 50. The sizes of ejectors 120 and 122 may be predetermined based on a predetermined amount of hydrogen generated and a predetermined speed of the reduction reaction. For example, the sizes of ejectors 120 and 122 may be increased to increase the hydrogen gas flow to the rebalancing reactors 106, 108, respectively, relative to the flow of electrolyte recirculated by pumps 30, and 32, respectively. In some examples, the sizes of ejectors 120, and 122 may be different, the sizes of each ejector predetermined according to the predetermined hydrogen flow rates to rebalancing reactors 106 and 108. For example, in an IFB, because the ferric ion concentration may be higher in the positive electrolyte 104 at the positive side of the redox flow battery system, a larger portion of the hydrogen gas may be drawn through ejector 122. As a further example, ejectors 120 and 122 may also comprise mechanical pumps for delivering liquid electrolyte and hydrogen gas to rebalancing reactors 106 and 108, respectively, where the mechanical pumps may be controlled by controller 80.

Because the amount of generated hydrogen in the redox flow battery system may be approximately equal to the amount of unbalanced ferric ions, recirculating the generated hydrogen to both the positive electrolyte source 52 (and positive electrode compartment 22) and the negative electrolyte source 50 (and negative electrode compartment 20), may aid in completely rebalancing the electrolytes. For example, recirculating the generated hydrogen to the negative electrolyte source 50 may aid in rebalancing free ferric ions that crossover through separator 24 from the positive electrode compartment 22.

Redox flow battery system 10 may further comprise an external source 124 of hydrogen gas. External source 124 may supply additional hydrogen gas to the positive electrolyte source 52 and the negative electrolyte source 50. External source 124 may alternately supply additional hydrogen gas to the inlet of rebalancing reactors 106, 108. As an example, a mass flow meter or other flow controlling device (which may be controlled by controller 80) may regulate the flow of the hydrogen gas from external source 124. The external source of hydrogen may supplement the hydrogen gas generated in redox flow battery system 10. For example, when gas leaks are detected in redox flow battery system 10 or when the reduction reaction rate is too low at low hydrogen partial pressure, an external source of hydrogen gas may be supplied in order to rebalance the state of charge of the electro-active species in the positive electrolyte and negative electrolyte. As an example, controller 80 may supply hydrogen gas from external source 124 in response to a measured change in pH or in response to a measured change in state of charge of an electrolyte or an electro-active species. For example, an increase in pH of the negative electrolyte source 50, or the negative electrode compartment 20, may indicate that hydrogen is leaking from the redox flow battery system 10 and/or that the reaction rate is too slow with the available hydrogen partial pressure, and controller 80, in response to the pH increase, may increase a supply of hydrogen gas from external source 124 to the redox flow battery system 10.

As a further example, controller 80 may supply hydrogen gas from external source 124 in response to a pH change, wherein the pH increases beyond a first threshold pH or decreases beyond second threshold pH. For example, a first threshold pH for the negative electrolyte 102 may be 4 and a second threshold pH for the negative electrolyte 102 may be 3. In other words, if the pH for the negative electrolyte 102 is measured beyond a first range (e.g., less than 3 or greater than 4), then controller 80 may adjust (e.g., increase or decrease, or shut off, etc.) the external hydrogen gas supply rate to return the pH to the first range. As another example, if the pH of the negative electrolyte 102 is greater than 4, then controller 80 may increase the external gas supply rate to supply additional hydrogen to increase the rate of reduction of ferric ions and the rate of production of protons, thereby reducing the positive electrolyte pH.

Furthermore, the negative electrolyte pH may be lowered by hydrogen reduction of ferric ions crossing over from the positive electrolyte 104 to the negative electrolyte 102 or by proton generated at the positive side crossing over to the negative electrolyte 102 due to a proton concentration gradient and electrophoretic forces. In this way, the pH of the negative electrolyte 102 may be maintained within the stable region from 3-4, while reducing the likelihood of precipitation of ferric ions (crossing over from the positive electrode compartment) to $Fe(OH)_3$.

Other control schemes for controlling the supply rate of hydrogen gas from external source 124 responsive to a change in an electrolyte pH or to a change in an electrolyte state of charge, detected by other sensors such as a pH probe, an oxygen-reduction potential (ORP) meter or an optical sensor, may be implemented. Further still, the change in pH or state of charge triggering the action of controller 80 may be based on a rate of change or a change measured over a time period. The time period for the rate of change may be predetermined or adjusted based on the time constants for the redox flow battery system. For example, the time period may be reduced if the recirculation rate is high, and local changes in concentration (e.g., due to side reactions or gas leaks) may quickly be measured since the time constants may be small.

Turning now to FIGS. 3-5, an example configuration of a catalyst bed 302 is shown. In a first view 300 shown in FIG. 3, the catalyst bed 302 is arranged planar and shown from a side view. In FIG. 4, the catalyst bed 302 is depicted rolled into a jelly-roll configuration and shown from a second view 400, illustrating one end of the jelly-roll. The jelly-roll catalyst bed 302 is shown in a third view 500 in FIG. 5 from a perspective view. A set of reference axes 301 are provided for comparison between views, indicating a y-axis, an x-axis, and a z-axis.

The planar catalyst bed 302 may be formed by coating a substrate layer 304 with a catalyst layer 306. One or both sides of the substrate layer 304 may be coated with the catalyst layer 306. Coating both sides of the substrate layer 304 may increase the redox reaction rate of the catalyst bed as compared to coating a single side of the substrate layer 304. Substrate layer 304 may include a flexible and bendable planar substrate such as carbon cloth, carbon paper, or another type of membrane. Substrate layer 304 may be porous or non-porous, and/or permeable to hydrogen gas, hydrogen ions, and to electrolyte including the positive electrolyte 104 and the negative electrolyte 102 from positive electrolyte source 52 and negative electrolyte source 50 of FIG. 1. Substrate layer 304 may further be inert with respect to hydrogen gas, hydrogen ions, and the electrolyte.

A thickness 308 of the substrate layer 304, as shown in FIG. 3, may be maintained sufficiently thin such that the substrate layer 304 may not impede diffusion or convective transport of electrolyte species through the substrate layer 304. When the substrate layer 304 is thinner than, for example, 0.5 mm, reaction rates may be higher than when the substrate layer 304 is thicker than 0.5 mm. The substrate layer 304 may be conductive, semi-conductive, or non-conductive. Conductive substrate layers may yield higher reaction rates relative to non-conductive substrate layers. For example, a carbon substrate (e.g., carbon cloth, carbon paper, and the like) may aid in electron transfer, and may provide a catalytic surface for the ferric/ferrous ion redox reaction. Some exemplary membrane materials which may be utilized for the substrate layer 304 includes polypropylene, polyolefin, perfluoroalkoxy (PFA), polysulfone amide (PSA), and the like. In addition, the substrate layer 304 may comprise a thin ceramic sheet or a thin metallic sheet, provided the sheet does not react with ferric ions.

The catalyst layer 306 may include one or more different types of catalyst materials such as platinum, palladium, ruthenium, and alloys thereof, as described above. The weight percent of the catalyst material on the substrate layer 304 may range from 0.2 wt % to greater than 0.5 wt %, as an example. The substrate layer 304, coated with the catalyst layer 306, may be porous and permeable to hydrogen gas, hydrogen ions, and to electrolyte including the positive electrolyte and the negative electrolyte. When hydrogen gas and metal ions in the electrolyte are fluidly contacted at the catalyst layer 306, e.g., the gas, ions and catalysts of the catalyst layer 306 all come into contact with one another, the catalyst layer 306 may catalyze a redox reaction whereby the hydrogen gas is oxidized to hydrogen ions and the metal ions are reduced (e.g., according to equations (5) and (6)). The substrate layer 304 may be coated entirely with the catalyst layer 306, e.g., covered with a uniform coating of the catalyst layer 306 across an entire surface are of the substrate layer 304, to increase a redox reaction rate of hydrogen gas and metal ions at the catalyst layer surface.

The catalyst bed 302 may further comprise a spacing layer 310 positioned over and in face-sharing contact with the catalyst layer 306. As shown in FIGS. 3-5, the spacing layer 310 may be thinner than the substrate layer 304, however in other examples, the substrate layer 304 may be thinner than the spacing layer 310. Thinner spacing layers may yield higher catalyst bed reaction rates with higher pressure drops across the catalyst bed 302 while thicker spacing layers may yield lower reaction rates with lower pressure drops across the catalyst bed 302. In some examples, the spacing layer 310 may be less than 1 mm thick.

The spacing layer 310 may comprise a mesh, such as a plastic or other type of non-conductive mesh. For example, the spacing layer 310 may comprise a polypropylene, polyolefin, polyethylene, polystyrene or other polymer mesh that is stable in (e.g., does not react with or degrade in the presence of) ferric/ferrous ion solutions. In other examples, the spacing layer 310 may comprise an open-celled plastic foam or sponge material.

The catalyst bed 302 may be spiral wound to form a jelly-roll catalyst bed 312, as shown in FIGS. 4 and 5. As illustrated in FIG. 4, successive substrate layers 304 and catalyst layers 306 of the spiral wound jelly-roll catalyst bed 312 are separated by the spacing layer 310. The spacing layer 310 may entirely cover the catalyst layer 306. In this way, successive catalyst layers 306 and substrate layers 304 in the jelly-roll catalyst bed 312 are entirely separated by the spacing layer 310. As shown in FIG. 5, the spacing layers 310 may extend across the entire axial dimension, e.g., along the z-axis, of the jelly-roll catalyst bed 312.

Turning now to FIG. 6, a diagram 600 shows the jelly-roll catalyst bed 312 inserted into a reactor vessel 602 in a rebalancing reactor of an IFB system, such as the rebalancing reactors 106, 108 of FIG. 1. In some examples, the reactor vessel 602 may include structures for supporting the jelly-roll catalyst bed 312 such as baffles, inlet/outlet pipes, shrouds, etc., or other flow distribution devices or systems for aiding in distributing electrolyte flow throughout layers of the jelly-roll catalyst bed 312. Furthermore, the reactor vessel 602 may include a distribution plate, positioned adjacent to an inlet or an outlet of the reactor vessel 602 and configured to control flow through the reactor vessel 602. The jelly-roll catalyst bed 312 may be entirely enclosed within the reactor vessel 602 and aligned with a central axis 601 of the reactor vessel 602. The central axis 601 is parallel with the z-axis. A height 620 of the jelly-roll catalyst bed 312, defined along the z-axis, may be less than a height 630 of the reactor vessel 602. In some examples, the height 620 of the jelly-roll catalyst bed 312 may be 50% of the height 630 of the reactor vessel 602. In other examples, the height 620 of the jelly-roll catalyst bed 312 may be anywhere between 5-95% of the height 630 of the reactor vessel 602. Electrolyte may enter the reactor vessel 602 through an inlet at a first, bottom end 604 (with respect to the z-axis) of the reactor vessel 602 as indicated by arrow 606.

Within the reactor vessel 602, the electrolyte may continue flowing upward as indicated by arrows 608. The electrolyte comes into contact with the jelly-roll catalyst bed 312 and at least a portion of the electrolyte flow may continue upwards, parallel with the central axis 601, as indicated by arrows 610. The linear flow of electrolyte may pass along outer and inner surfaces of the jelly-roll catalyst bed 312. At least a portion of the flow may rotate, as indicated by arrows 605, as the electrolyte contacts the jelly-roll catalyst bed 312, causing the flow to swirl around and/or across inner surfaces of the jelly-roll catalyst bed 312 while travelling axially through the reactor vessel 602. It will be appreciated that the arrows 605 are a non-limiting example of rotational flow and in other examples, the electrolyte may rotate in an opposite direction.

As electrolyte flows across surfaces of the jelly-roll catalyst bed 312, hydrogen gas entrained by electrolyte flow upstream of the reactor vessel 602 and carried into the reactor vessel 602 by the flow may be oxidized while metal cations, such as ferric iron, may be reduced. The catalyzed redox reactions at the jelly-roll catalyst bed 312 may assist in rebalancing electrolyte and pH of the IFB system when the electrolyte is returned to cell stacks of the IFB system. The electrolyte may converge within the reactor vessel 602, as indicated by arrows 612, at a second, upper end 614 of the reactor vessel 602 and flow out through an outlet of the reactor vessel 602, as indicated by arrow 616.

Dimensions of a catalyst bed of a rebalancing reactor, e.g., the jelly-roll catalyst bed 312 of FIG. 3, may impact an efficiency of the catalyst bed in facilitating redox reactions to rebalance IFB electrolyte. For example, varying a height of the catalyst bed within a reactor vessel, such as the reactor vessel 602 of FIG. 6, may affect coalescence of hydrogen bubbles within the reactor vessel. Congregation of small hydrogen bubbles, proximate to an inlet of the reactor vessel, into large bubbles upstream of an outlet of the reactor vessel may block electrolyte from interfacing with catalyst sites on the catalyst bed. As a result, a reaction rate of the rebalancing reactor may be reduced, degrading a rebalancing capacity of the rebalancing reactor.

Coalescence of hydrogen bubbles in the reactor vessel may increase a diffusion length from a gas interface between the hydrogen bubbles and electrolyte to the catalyst sites on a surface of the catalyst bed. For example, the diffusion length becomes longer on average as a size of the hydrogen bubbles and a distance between the hydrogen bubbles increases. The greater diffusion length may lead to higher resistance and a lower reduction rate at the catalyst bed.

Figure 7:
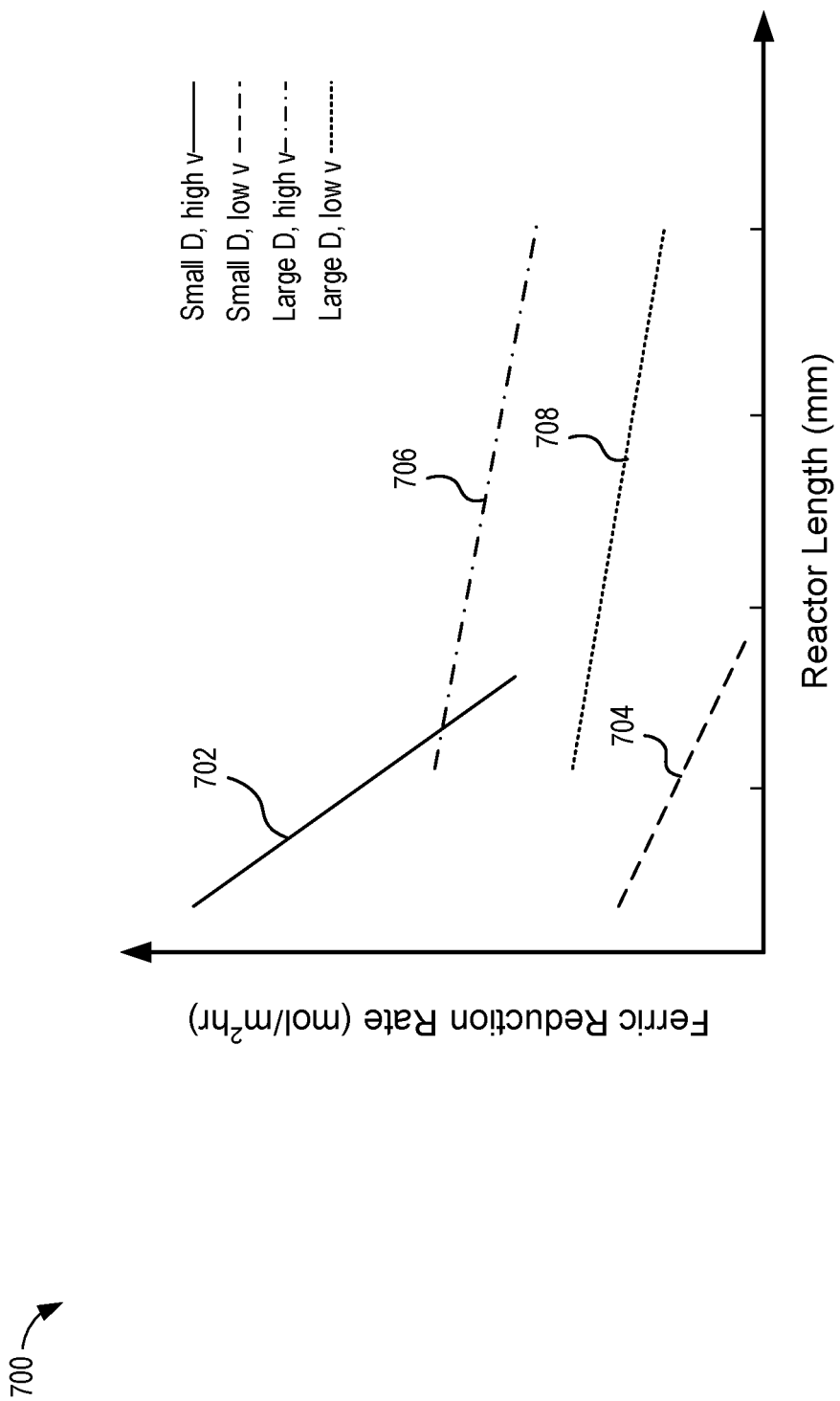
FIG. 7 is a graph illustrating a dependency of ferric ion reduction rate on catalyst bed length.

As an example, a comparison of an effect of catalyst bed height on ferric ion reduction is shown in graph 700 in FIG. 7. Graph 700 depicts a dependency of ferric ion reduction rate on reactor length. In one example, the reactor represented in graph 700 may be the reactor vessel 602 of FIG. 6, adapted with the jelly-roll catalyst bed 312. A first plot 702 represents a small diameter, high linear velocity (e.g., configured to enable high flow rates through the reactor) reactor. For example, the diameter may be 1 inch and the high linear velocity may be 7-9 cm/s. A second plot 704 represents a small diameter, low linear velocity reactor. As an example, the low linear velocity may be 4.5-5 cm/s. A third plot 706 represents a large diameter, such as 6 inches in diameter, for example, high linear velocity reactor and a fourth plot 708 may be a large diameter, low linear velocity reactor.

Results illustrated in graph 700 show that reduction rates decline as reactor length increases and high linear velocities are associated with higher reduction rates. Furthermore, highest reduction rates are provided by small diameter, high linear velocity reactors, as shown by the first plot 702. Additionally, reduction rates drop more rapidly as reactor length increases in the first plot 702 compared to any of the second plot 704, third plot 706 or fourth plot 708. The results of graph 700 indicate that high rebalancing efficiency may be achieved using short length catalyst configured to achieve high linear flow rates therethrough.

In addition, a positioning of a catalyst bed within a reactor vessel may also moderate efficiency of redox reaction catalysis at catalyst sites of the catalyst bed. As an example, a comparison of an effect of different catalyst bed placement on ferric ion reduction rate is illustrated in FIGS. 8 and 9. Five reactor vessels with various catalyst bed configurations are shown, the reactor vessels adapted to flow electrolyte and hydrogen into the reactor vessels through inlets at a bottom end, relative to the z-axis, of each reactor vessel, and flow electrolyte out of the reactor vessels through outlets at an upper end of each reactor, as indicated by arrows 801. In one example, each of the reactor vessels shown in FIG. 8 may be non-limiting examples of the rebalancing reactors 106, 108 of FIG. 1. A catalyst bed of each of the reactor vessels may be, for example, the jelly-roll catalyst bed 312 of FIGS. 3-6. Heights of the reactor vessels and enclosed catalyst beds are defined along the z-axis.

The reactor vessels shown in FIG. 8 includes a first reactor vessel 820 equipped with two catalyst beds stacked on top of one another along the z-axis. A height of the stacked catalyst beds may be similar to a height of the reactor vessel. A second reactor vessel 804 includes a single catalyst bed with a height equal to half of a height of the second reactor vessel 804. The catalyst bed is positioned in a lower half of the second reactor vessel 804, immediately above an inlet of the second reactor vessel 804. A third reactor vessel 806 has a single catalyst bed with a height equal to half a height of the third reactor vessel 806, with the catalyst bed positioned in an upper half of the third reactor vessel 804, immediately below an outlet of the third reactor vessel 806. A fourth reactor vessel 808 also has a single catalyst bed with a height equal to half a height of the fourth reactor vessel 808, with the catalyst bed positioned in an upper half of the fourth reactor vessel 808. An inert sheet is positioned in a lower half of the fourth reactor vessel 808, immediately below the catalyst bed. The inert sheet may be formed of a material such as mylar, for example. A fifth reactor vessel 810 has a catalyst bed with a height equal to half of a height of the fifth reactor vessel 810. The catalyst bed is positioned in a central region of the height of the fifth reactor vessel 810, equally spaced away from an inlet as an outlet of the fifth reactor vessel 810 along the z-axis.

Ferric iron reduction rates for each of the reactor vessels of FIG. 8 are shown in a bar graph 900 in FIG. 9. A first bar 902 corresponds to reduction rates for the first reactor vessel 802, a second bar 904 corresponds to reduction rates for the second reactor vessel 804, a third bar 906 corresponds to reduction rates for the third reactor vessel 806, a fourth bar 908 corresponds to reduction rates for the fourth reactor vessel 808, and a fifth bar 910 corresponds to reduction rates for the fifth reactor vessel 810. Reduction rates are highest for the second reactor vessel 804 and the fifth reactor vessel 810, where the second reactor vessel 804 reduction rates exceeds reduction rates of the fifth reactor vessel 810. Lowest reductions rates are associated with the fourth reactor vessel 808. The results depicted in FIG. 9 indicate reduction rates increase as a proximity of a catalyst bed to an inlet of a reactor vessel increases. When the catalyst bed is positioned near an outlet of the reactor vessel, hydrogen bubble coalescence below the catalyst bed may occur, impeding catalysis of hydrogen oxidation and ferric ion reduction, and flow distribution through the upper catalyst may be poor.

As shown in FIGS. 7 and 9, reducing a length of a catalyst bed of a rebalancing reactor and positioned the catalyst bed in a lower region of the rebalancing reactor, adjacent to a reactor inlet, may enhance a reactivity of the catalyst bed. However, reducing the length of the catalyst bed may decrease an amount of catalyst available to facilitate hydrogen oxidation and ferric ion reduction, thereby decreasing an overall efficiency of the rebalancing reactor. This issue may be addressed by implementing a multi-stage rebalancing reactor including a plurality of small reactor vessels arranged in a path of electrolyte flow. Each stage in the multi-stage rebalancing reactor may be one of the reactor vessels of the plurality of small reactor vessels. High reactivity is thus maintained by incorporating a short catalyst bed in each of the plurality of small reactor vessels.

Various configurations for an electrolyte circuit in an IFB system, such as the redox flow battery system 10 of FIG. 1, are shown in FIGS. 10-14. The configurations each incorporate a multi-stage rebalancing reactor fluidly coupled to an electrolyte tank. As an example, the electrolyte tank may be either the negative electrolyte source 50 or the positive electrolyte source 52 of FIG. 1. Hydrogen gas from a head space of the electrolyte tank may be entrained into a flow of electrolyte via a gas line plumbed into an electrolyte passage between the electrolyte tank and the multi-stage rebalancing reactor. Each reactor vessel of the multi-stage rebalancing reactor may include a short catalyst bed (e.g., having a shorter length/height than a housing of the reactor vessel) arranged proximate to an inlet at a bottom end of each reactor vessel, as shown by the second reactor vessel 802 of FIG. 8. As an example, the catalyst bed may be 200-400 mm tall.

Figure 10:
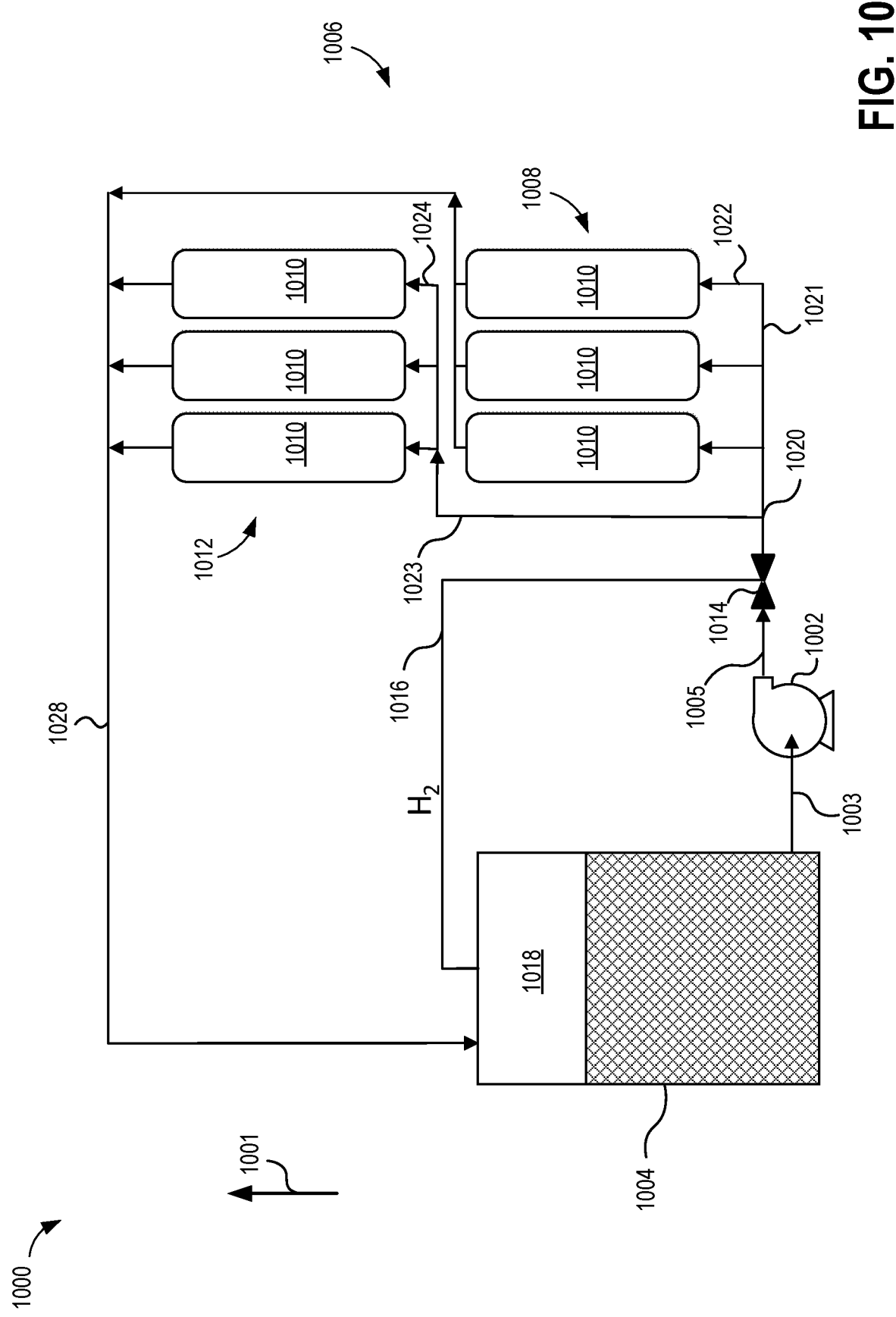
FIG. 10 is a first example of an electrolyte circuit of a redox flow battery, incorporating a first embodiment of a multi-stage rebalancing reactor.

A first example of an electrolyte circuit 1000 is shown in FIG. 10. A vertical direction, e.g., parallel with the y-axis of the set of reference axes 301 of FIGS. 3-6, is indicated by arrow 1001 in FIGS. 10-12. A pump 1002 may drive electrolyte flow from an electrolyte tank 1004 to a multi-stage rebalancing reactor 1006. The multi-stage rebalancing reactor 1006 has a first stage 1008 formed of three reactor vessels 1010 arranged in parallel and a second stage 1012, also formed of three reactor vessels 1010 arranged in parallel. Each of the reactor vessels 1010 may be distinct, stand-alone units, having individual outer housings. Reactor vessels 1010 within one stage may not fluidly communicate with one another. For example, in the first stage 1008, the three reactor vessels 1010 do not exchange electrolyte with one another and similarly, in the second stage 1012, the three reactor vessels 1010 do not exchange electrolyte with one another. Furthermore, the reactor vessels 1010 of the first stage 1008 do not exchange electrolyte with the reactor vessels 1010 of the second stage 1012.

The pump 1002 is arranged downstream of the electrolyte tank 1004 and upstream of the multi-stage rebalancing reactor 1006. When the pump 1002 is operating, the pump 1002 drives electrolyte flow out of the electrolyte tank 1004, as indicated by arrow 1003, through the pump 1002, and through an injector 1014, as indicated by arrow 1005. The injector 1014 may be located between the pump 1002 and the multi-stage rebalancing reactor 1006. In some examples, the injector 1014 may be used in place of an ejector, such as the ejectors 120, 122 shown in FIG. 1, also configured to add hydrogen to electrolyte.

A gas line 1016 may extend between a top of the electrolyte tank 1004 and the injector 1014. Hydrogen gas accumulating in a head space 1018 of the electrolyte tank 1004 may be siphoned through the gas line 1016 and injected into the flow of electrolyte by the first injector 1014. A first junction 1020 is located immediately downstream of the injector 1014. The first junction 1020 may split the electrolyte flow into a first portion that flows to the first stage 1008 of the multi-stage rebalancing reactor 1006 and a second portion that flows to the second stage 1012 of the multi-stage rebalancing reactor 1006.

The first portion of electrolyte flow may flow along a first passage 1021 to be divided amongst individual electrolyte passages to each of the reactor vessels 1010 of the first stage 1008, as indicated by arrows 1022. The second portion may flow to the second stage 1012 via a second passage 1023 and to be divided amongst individual electrolyte passages to each of the reactor vessels 1010 of the second stage 1012, as indicated by arrows 1024. In other words, each reactor vessel of the reactor vessels 1010 of the first stage 1008 may be arranged in parallel with other reactor vessels 1010 of the first stage 1008. Similarly, each reactor vessel of the reactor vessels 1010 of the second stage 1012 are also arranged in parallel with the other reactor vessels 1010 of the second stage 1012.

Treated electrolyte emerges from each of the reactor vessels 1010 of the first stage 1008 and the second stage 1012 to flow into a common passage 1028 that returns the treated electrolyte to the electrolyte tank 1004. In this way, electrolyte stored in the electrolyte tank 1004 may be continually rebalanced by passing the electrolyte through the multi-stage rebalancing reactor and injecting hydrogen gas into the flow upstream of the multi-stage rebalancing reactor. It will be appreciated that the multi-stage rebalancing reactor shown in FIG. 10 is a non-limiting example and other examples may include variations in a number of stages of the multi-stage rebalancing reactor. For example, in large IFB systems utilizing large quantities of electrolyte, additional stages of the multi-stage rebalancing reactor may be included. Alternatively, smaller systems may have a single stage of reactor vessels. The multi-stage rebalancing reactor may have any of one to four or more stages without departing from a scope of the present disclosure.

Figure 11:
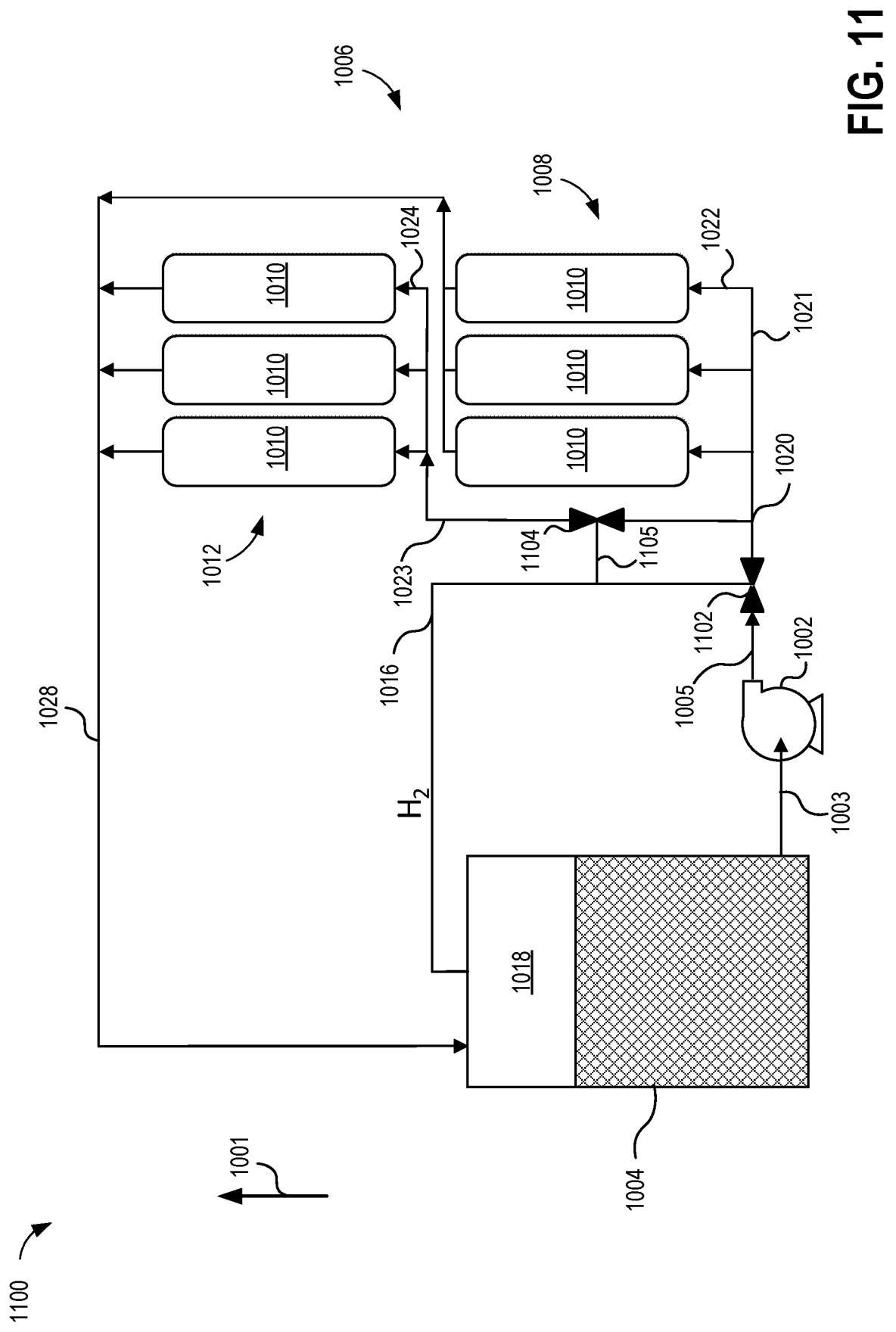
Figure 12:
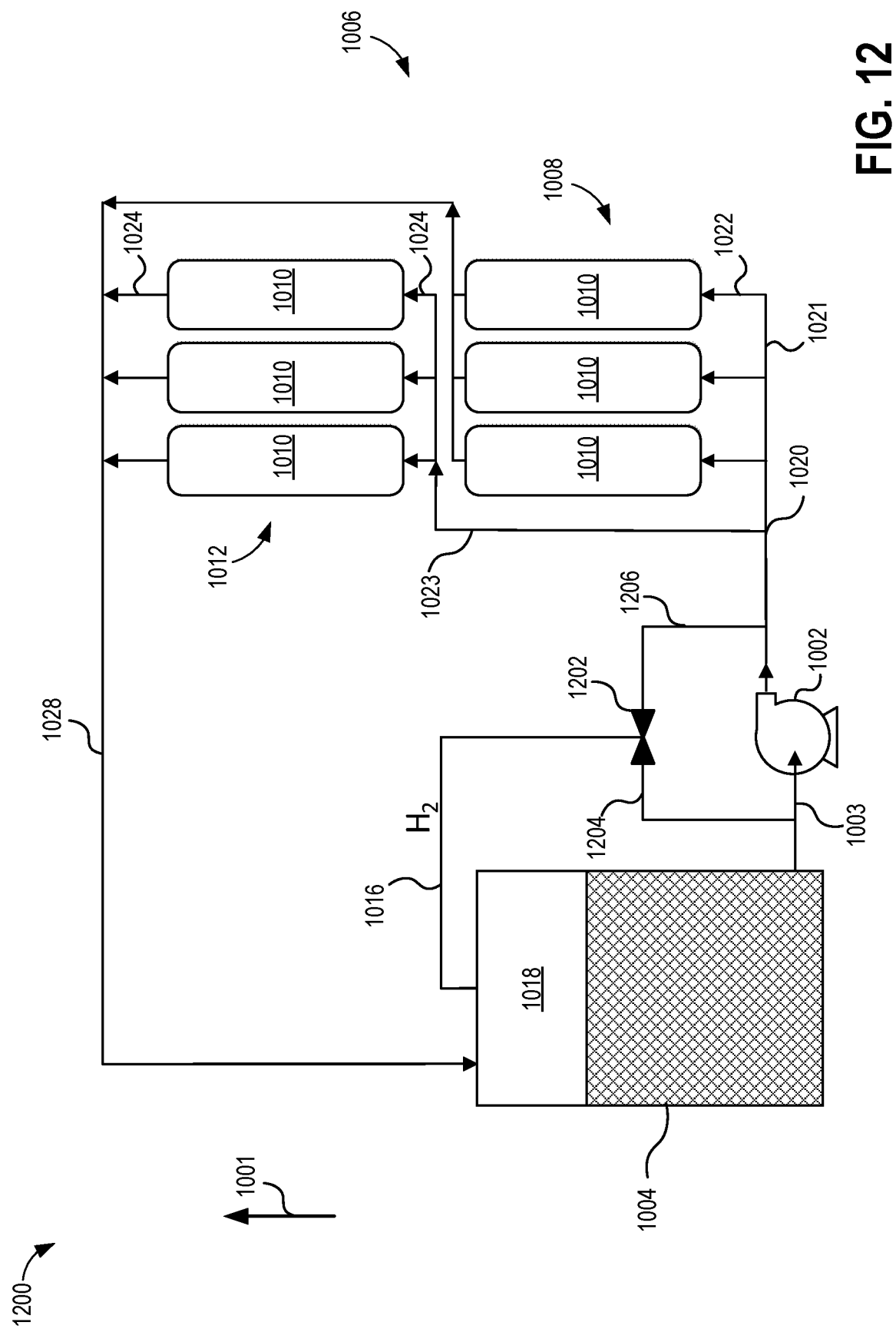
FIG. 12 is a third example of an electrolyte circuit of a redox flow battery, incorporating the first embodiment of the multi-stage rebalancing reactor.

A second example of an electrolyte circuit 1100 and a third electrolyte circuit 1200 are shown in FIGS. 11 and 12, respectively. The second example of the electrolyte circuit 1100 and the third example of the electrolyte circuit 1200 also include the pump 1002, the electrolyte tank 1004, and the multi-stage rebalancing reactor 1006 of FIG. 10. The second example of the electrolyte circuit 1100 of FIG. 11 is similarly configured as the first example of the electrolyte circuit 1000 of FIG. 10 but includes a first injector 1102 and an additional, second injector 1104 coupled to the gas line 1016 at a branch 1105 of the gas line 1016. The second injector 1104 is disposed in the second passage 1023 flowing untreated electrolyte from the first junction 1020 to the second stage 1012 of the multi-stage rebalancing reactor 1006. Hydrogen gas is injected into the electrolyte through the second passage 1023 via the second injector 1104. The first and second injectors 1102, 1104 of FIG. 11 may be smaller than the injector 1014 of FIG. 10.

The second injector 1104 provides an additional supply of hydrogen to mix with electrolyte prior to interaction with the reactor vessels 1010 of the second stage 1012. The additional hydrogen input may promote a higher rate of hydrogen oxidation and, therefore, a higher rate of ferric ion reduction at the multi-stage rebalancing reactor 1006. For example, in the first example of the electrolyte circuit 1000 of FIG. 10, an amount of hydrogen injected at the injector 1014 may be divided between the first stage 1008 and the second stage 1012. At one or more of the first stage 1008 and the second stage 1012, the amount of hydrogen mixed into the electrolyte flow may not be enough to fully rebalance the electrolyte. A rate of ferric ion reduction may be dependent on transfer of electrons provided by the oxidation of hydrogen gas. Thus, if the amount of hydrogen entrained in the electrolyte does not match a demand for complete ferric ion reduction, the electrolyte may not be rebalanced and/or a pH of the electrolyte may not be maintained sufficiently acidic. The second example of the electrolyte circuit 1100 of FIG. 11 may thereby supplement the amount of hydrogen delivered to each stage of the multi-stage rebalancing reactor 1006 and drive a lower pH of the electrolyte.

In some examples the first injector 1102 and the second injector 1104 may deliver hydrogen as commanded by a controller, such as controller 88 of FIG. 1. The injectors may be configured to actively inject hydrogen when pumps coupled to the injectors are activated or when flow reaches a minimum, threshold rate. For example, when a pH change or state of charge imbalance is detected in the electrolyte, the first injector 1102 may inject hydrogen into the electrolyte. In some examples, if the amount of hydrogen directed to the first injector 1102 does not decrease the pH to a desired level, or the state of charge is not rebalanced, a second pump (not shown) coupled to the second injector 1104 may be activated to increase the amount of hydrogen delivered to the multi-stage rebalancing reactor 1006 via the second injector 1104.

By incorporating the second injector 1104 into the second example of the electrolyte circuit 1100, the second example of the electrolyte may allow hydrogen bubbles in electrolyte to be broken down into smaller bubbles than a circuit configured with a single injector, e.g., the first example of the electrolyte circuit 1000 of FIG. 10. Increased turbulence provided by the second injector 1104 may reduce a likelihood of bubble coalescence and increase an efficiency of the multi-stage rebalancing reactor 1006.

The third example of the electrolyte circuit 1200 shown in FIG. 12 depicts an alternative injection location of hydrogen into the path of electrolyte flow. The gas line 1016 extends from the electrolyte tank 1004 to an injector 1202. The injector 1202 is arranged at an intersection where a flow of hydrogen is divided between a first branch 1204 and a second branch 1206. The first branch 1204 directs hydrogen gas to mix with electrolyte flow upstream of the pump 1002, between the electrolyte tank 1004 and the pump 1002. The second branch 1206 mixes hydrogen gas with the electrolyte downstream of the pump 1002 and upstream of the first junction 1020.

By mixing hydrogen gas into the electrolyte both upstream and downstream of the pump 1002, a portion of the hydrogen gas passes through the pump. When the hydrogen gas is injected into the electrolyte, the gas forms bubbles that are carried along with the electrolyte flow. The bubbles are sheared when the gas/electrolyte mixture engages with the pump, reducing a size of the bubbles delivered to the multi-stage rebalancing reactor 1006. Even if the bubbles undergo coalescence within the reactor vessels 1010, a reduced size of the bubbles prior to coalescence may result in smaller coalesced bubbles. A reactivity of the multi-stage rebalancing reactor 1006 may be increased as a result.

Injection of hydrogen gas upstream of the pump 1002 may demand adaptation of the pump 1002 in the third example of the electrolyte circuit 1200 to be a pump able to pump a gas/fluid mixture with a higher gas volume ratio that the previous examples of the electrolyte circuit. While using a more robust pump may increase a cost of the pump, the reactivity of the third example of the electrolyte circuit 1200 may show a 50-100% increase in reaction rates at the multi-stage rebalancing reactor 1006 as a result, thereby offsetting increased pump cost.

While distinct differences between the first, second, and third examples of the electrolyte circuit 1000, 1100, 1200 are shown in each of FIGS. 10-12 respectively, other examples of the electrolyte circuit may include combinations of various elements of the different configurations. For example, the dividing of hydrogen gas injection upstream and downstream of the pump 1002, as illustrated in FIG. 12, may be combined with implementation of the second injector 1104 depicted in FIG. 11. Furthermore, all three examples of the electrolyte circuit may be adapted with varying numbers of stages of the multi-stage rebalancing reactor 1006.

Figure 13:
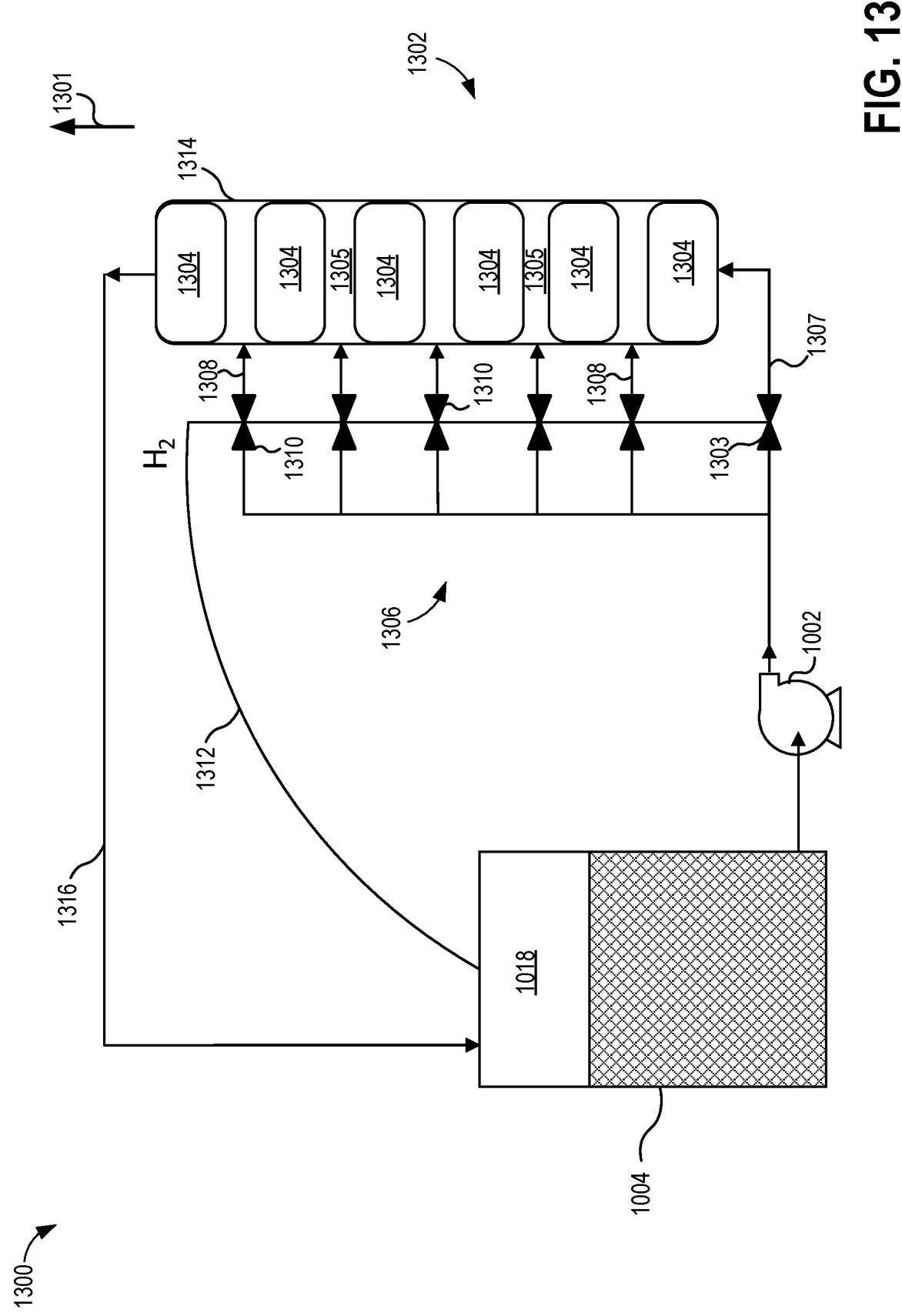
FIG. 13 is a fourth example of an electrolyte circuit of a redox flow battery, incorporating a second embodiment of a multi-stage rebalancing reactor.
Figure 14:
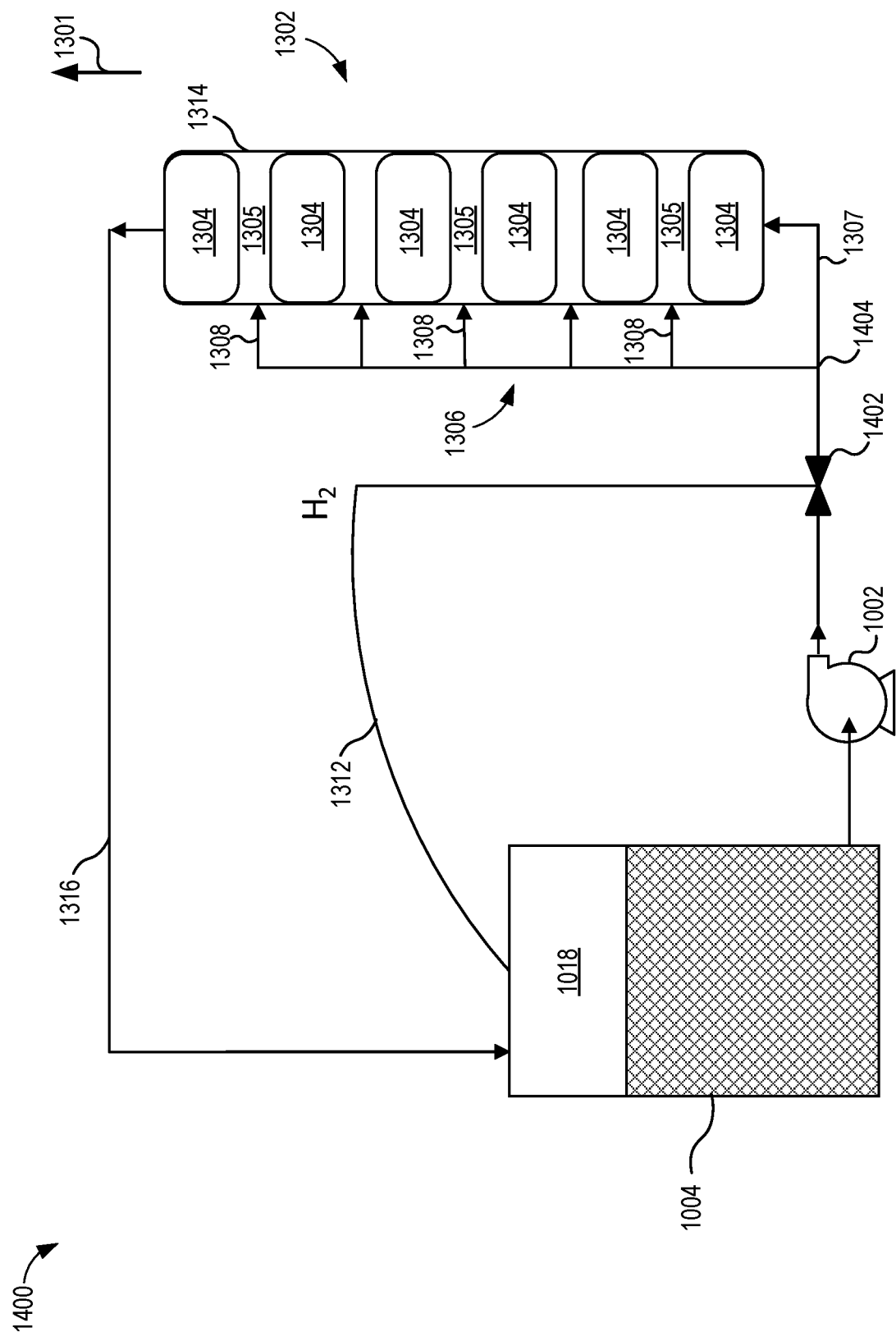
FIG. 14 is a fifth example of an electrolyte circuit of a redox flow battery, incorporating the second embodiment of the multi-stage rebalancing reactor.
Figure 15:
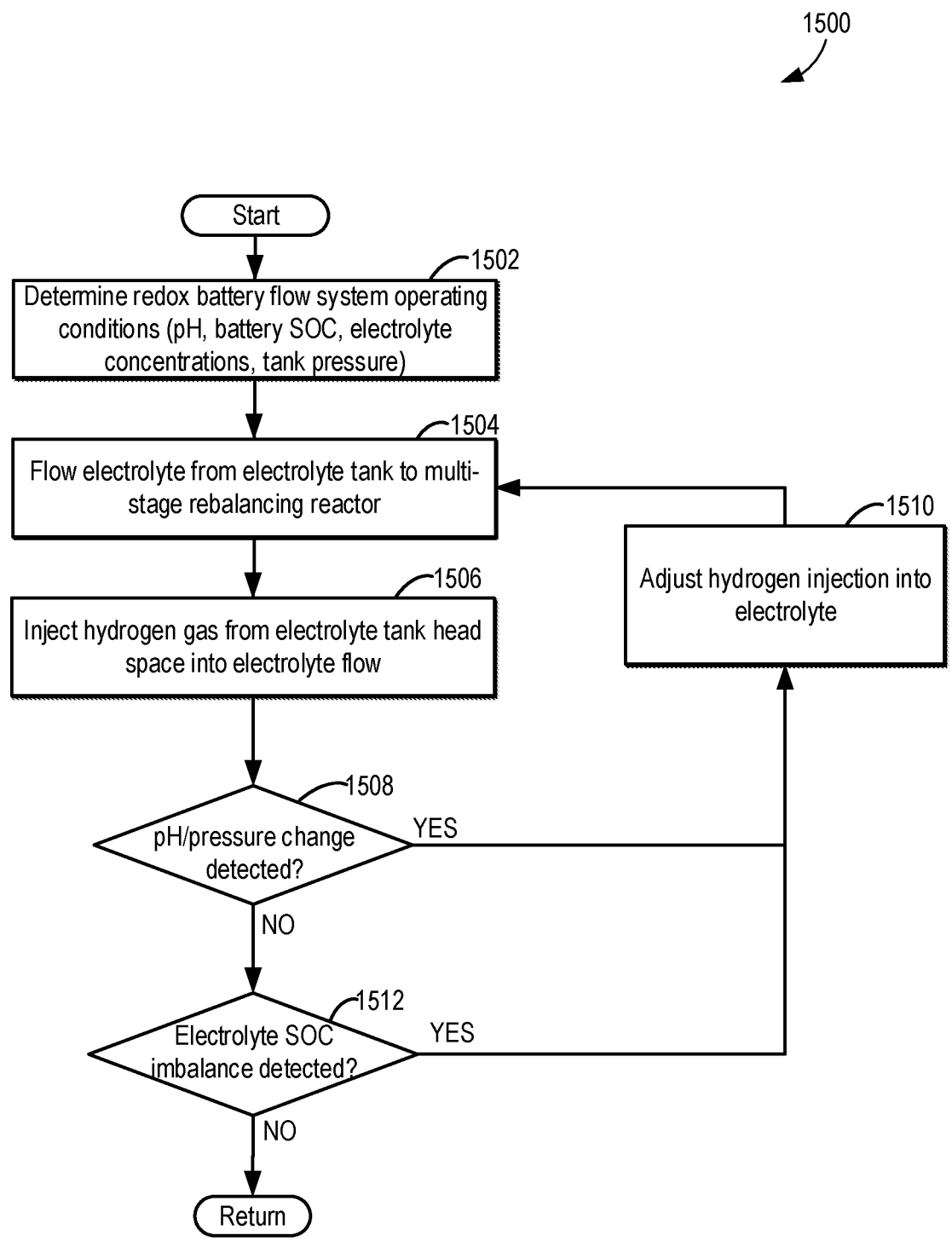
FIG. 15 shows an example of a routine for rebalancing electrolyte in the IFB where the IFB is configured with the multi-stage rebalancing reactor.

A fourth example of an electrolyte circuit 1300 and a fifth example of an electrolyte circuit 1400 are shown in FIGS. 13 and 14, respectively. A vertical direction for a multi-stage rebalancing reactor is indicated by arrow 1301 in FIGS. 13-14. However, the arrow 1301 only represents the vertical direction for the rebalancing reactors and not other components of the electrolyte circuits. Both the fourth and fifth examples of the electrolyte circuit 1300, 1400, show a different configuration of a multi-stage rebalancing reactor from that of FIGS. 10-12. In FIGS. 13 and 14, a multi-stage rebalancing reactor 1302 may have more than one reactor vessel 1304 all arranged in series, with each reactor vessel 1304 serving as a stage of the multi-stage rebalancing reactor 1302. The multi-stage rebalancing reactor 1302 is shown in FIGS. 13 and 14 with the reactor vessels 1304 positioned horizontally but other examples may include arranging the multi-stage rebalancing reactor 1302 so that each reactor vessel 1304 is aligned with the vertical direction 1301.

The fourth example of the electrolyte circuit 1300 shown in FIG. 13 includes the electrolyte tank 1004 and the pump 1002, pumping electrolyte from the electrolyte tank 1004 to the multi-stage rebalancing reactor 1302. Electrolyte may be delivered to the multi-stage rebalancing reactor 1302 via a first passage 1307 coupled to an inlet at a bottom of the multi-stage rebalancing reactor 1302 to the pump 1002. A first injector 1303 may be arranged in the first passage 1307 to inject hydrogen in electrolyte from a manifold 1306. Electrolyte may flow through the multi-stage rebalancing reactor 1302 from the inlet to an outlet at a top of the multi-stage rebalancing reactor 1302, passing through each of the reactor vessels 1304 sequentially.

The manifold 1306 may deliver hydrogen to the each of the reactor vessels 1304 of the multi-stage rebalancing reactor 1302 via a plurality of delivery lines 1308. The plurality of delivery lines 1308 may direct hydrogen to regions between adjacent reactor vessels 1304, thereby providing hydrogen to each individual reactor vessel and decreasing a distance travelled by the hydrogen bubbles. By injecting hydrogen to each reactor vessel, a small size of hydrogen bubbles is maintained as the hydrogen is delivered directly to the reactor vessel, reducing coalescence of the bubbles into larger bubbles.

The reactor vessels 1304 may be shorter in height than the reactor vessels shown in FIGS. 10-12 and configured as integrated but discrete units enclosed within a common housing 1314. For example, each of the reactor vessels 1304 may be similar to the jelly roll catalyst bed 302 of FIGS. 3-5, connected in series with ports to allow hydrogen to mix with electrolyte flowing therethrough. The housing 1314 may be a support housing under each of the reactor vessels 1304 to hold the reactor vessels in position. The reactor vessels 1304 may be relatively short in height, such as 200 mm.

An inner volume of the housing 1314 includes the reactor vessels 1304 and spaces 1305 in between. The spaces 1305 may all be fluidly coupled to one another, enabling electrolyte to flow around each internal reactor vessel 1304. Electrolyte may enter the multi-stage rebalancing reactor 1302 through the inlet at the bottom of the housing 1314 and flow upwards, through the reactor vessels 1304 and the spaces 1305 between the reactor vessels 1304, and exit the multi-stage rebalancing reactor 1302 through the outlet at the top of the housing 1314. Electrolyte delivered to the multi-stage rebalancing reactor 1302 may interact with two or more reactor vessels before exiting the multi-stage rebalancing reactor 1302.

Hydrogen may be introduced to the multi-stage rebalancing reactor 1302 by an injector 1310 disposed in each of the plurality of delivery lines 1308 of the manifold 1306. A gas line 1312 may siphon hydrogen from the head space 1018 of the electrolyte tank 1004 and flow hydrogen to each injector 1310. Thus gas is injected into the electrolyte at each of the plurality of delivery lines 1308 upstream of each reactor vessel 1304. By injecting gas at each of the plurality of delivery lines 1308, a uniform amount of hydrogen may be directed to each reactor vessel 1304, enabling consistently high reactivity amongst the reactor vessels 1304. Furthermore, a size of the hydrogen bubbles delivered to each reactor vessel 1304 is small, allowing high reaction rates.

In some examples, pumps coupled to the injectors 1310 (not shown in FIG. 13) may be operated and controlled independently by a controller, e.g., controller 88 of FIG. 1. As a pH and a state of charge imbalance is detected to increase, a number of pumps activated may also increase. For example, when the pH is determined to rise above a threshold pH, a pump coupled to the injector 1310 may be turned on to provide hydrogen gas to the multi-stage rebalancing reactor 1302. However, if the amount of delivered hydrogen gas does not effectively lower the electrolyte pH, another pump may be turned on to increase hydrogen flow to the multi-stage rebalancing reactor 1302. More of the injectors 1310 may be sequentially adjusted to deliver hydrogen until the pH drops to below the threshold level, allowing at least some of the active injectors to be deactivated by turning off the corresponding pumps.

Treated electrolyte flows from out of the multi-stage rebalancing reactor 1302 through a passage 1316 which extends between the multi-stage rebalancing reactor 1302 and the electrolyte tank 1004, thereby replenishing the electrolyte tank 1004 with rebalanced electrolyte. In another example, such as the fifth example of the electrolyte circuit 1400 shown in FIG. 14, the electrolyte circuit may be configured with a single injector 1402 rather than multiple injectors. The injector 1402 of FIG. 14 may be larger in size than the injectors 1310 of FIG. 13.

The pump 1002 similarly drives electrolyte flow from the electrolyte tank 1004 to the manifold 1306 of the multi-stage rebalancing reactor 1302. Electrolyte is delivered to the inlet at the bottom of the housing 1314 of the multi-stage rebalancing reactor 1302 via the first passage 1307. The injector 1402 is positioned downstream of the pump 1002 and upstream of the manifold 1306 in the path of electrolyte flow. The gas line 1312 flows hydrogen from the head space 1018 of the electrolyte tank 1004 to the injector 1402.

Hydrogen may be mixed with the electrolyte at the injector 1402. The electrolyte flow may be divided at the injector 1402 so that a first portion of the electrolyte is not mixed with hydrogen and continues flowing through the first passage 1307 to the inlet of the multi-stage rebalancing reactor 1302 to flow sequentially through the reactor vessels 1304. A second portion of the electrolyte is mixed with the hydrogen and the hydrogen-rich electrolyte may be diverted to flow through the manifold 1306 at a junction 1404 where the manifold 1306 and the first passage 1307 intersect. The hydrogen-rich electrolyte is injected into the multi-stage rebalancing reactor 1302 by the plurality of delivery line 1308, to spaces 1305 between each of the reactor vessels 1304.

The fifth example of the electrolyte circuit 1400 of FIG. 14 may provide a less complex configuration with fewer components and connections and therefore less likelihood of leakage. A cost of the electrolyte circuit 1400 of FIG. 14 may be reduced compared to the electrolyte circuit 1300 of FIG. 13 due to a smaller number of parts, such as injectors, fittings, etc. Delivery of small hydrogen bubbles to the reactor vessels 1304 is maintained in the fifth example of the electrolyte circuit 1400 of FIG. 14 by providing direct pathways for the hydrogen-rich electrolyte to flow to each of the reactor vessels 1304 through the manifold 1306.

By arranging the reactor vessels 1304 of the multi-stage rebalancing reactor 1302 as shown in FIGS. 13 and 14, the multi-stage rebalancing reactor 1302 may be more compact and occupy a smaller space than the multi-stage rebalancing reactor 1006 of FIGS. 10-12. In some examples, aspects of the first through third examples of the electrolyte circuit 1000, 1100, 1200 may be included in the fourth and fifth examples of the electrolyte circuit 1300, and 1400. For example, at least a portion of the hydrogen flowing through the gas line 1312 in FIGS. 13 and 14 may be diverted upstream of the pump 1002 to increase shearing of hydrogen bubbles suspended in the electrolyte flow.

An example of a routine 1500 for rebalancing an IFB system is illustrated in FIG. 15. The IFB system may be the redox flow battery system 10 shown in FIG. 1, adapted with a multi-stage rebalancing reactor to restore a charge balance and/or lower a pH of an electrolyte of the IFB system. The multi-stage rebalancing reactor includes reactor vessels, arranged in stages where reactor vessels within one stage are arranged parallel with one another and the stages are arranged in series in a path of electrolyte flow. Each stage may include one or more reactor vessels. Each reactor vessel has an inlet at a bottom end and an outlet at an upper end, directing electrolyte to flow upwards through the reactor vessels. A catalyst bed is housed within each reactor vessel, positioned immediately above the inlet and spaced away from the outlet of the reactor vessel. In other words, a height of the catalyst bed is less than a height of the reactor vessel housing and the catalyst bed is biased towards the inlet. In one example, the catalyst bed may be the jelly-roll catalyst bed shown in FIGS. 3-6. The rebalancing reactor may be incorporated in an electrolyte circuit of the IFB system and coupled to a negative electrolyte storage tank or a positive electrolyte storage tank of the IFB system. The electrolyte circuit may be any of the examples of electrolyte circuits depicted in FIGS. 10-14. Routine 1500 may be carried out as executable instructions stored in memory on board a controller of the IFB system, such as the controller 88 of FIG. 1.

At 1502, the routine includes measuring and/or detecting electrolyte chemical properties including pH, tank gas pressure, battery state of charge (SOC), electrolyte concentrations, etc., via various sensors and probes (e.g., sensors 60, 62, 70, 72). As an example, the battery SOC may be determined using an optical sensor, the pH may be measured using a pH meter, electrolyte storage tank pressure may be measured by a pressure transducer, and electrolyte concentration may be monitored using an ORP probe for measuring electrolyte potential.

Electrolyte flows from the electrolyte storage tank to the multi-stage rebalancing reactor at 1504 during charging of the IFB system. In some examples, the electrolyte may flow into a manifold delivering electrolyte to each reactor vessel of the multi-stage rebalancing reactor or through one or more inlets in a common housing of the multi-stage rebalancing reactor. The electrolyte contacts reaction sites on surfaces of the catalyst bed as the electrolyte flows through the reactor vessel.

The routine includes injecting hydrogen gas into the electrolyte upstream of the multi-stage rebalancing reactor at 1506. The hydrogen gas may be injected via one or more injectors positioned between a pump and the multi-stage rebalancing reactor through a gas line siphoning hydrogen gas from a head space of the electrolyte storage tank. The pump may be arranged downstream of the electrolyte tank, driving electrolyte flow to the multi-stage rebalancing reactor.

In some examples, more than one pump may be included, arranged at different positioned relative in the electrolyte circuit. For example, a first injector may allow hydrogen gas to enter the electrolyte flow delivered to a first stage of the multi-stage rebalancing reactor and a second injector may deliver hydrogen gas to a second stage of the multi-stage rebalancing reactor, as shown in FIG. 11. Flow of hydrogen gas to the first stage and the second stage may be concurrent or may be controlled independently, according to a demand for electrolyte rebalancing. In another example, the manifold directing electrolyte flow to the multi-stage rebalancing reactor may have one injector per delivery line, as shown in FIG. 13, each injector simultaneously injecting hydrogen or controlled independently. Furthermore, in other examples, the gas line may be branched to deliver gas both upstream and downstream of one of the injectors, as shown in FIG. 12, to increase shearing of hydrogen bubbles formed when the hydrogen gas is injected into the electrolyte.

When the hydrogen gas is introduced to the electrolyte flow, the hydrogen gas is carried with the electrolyte to each reactor vessel of the multi-stage rebalancing reactor. Thus, the hydrogen gas also contacts the catalytic sites on the surfaces of the catalyst bed. By flowing both electrolyte and hydrogen gas to the catalytic sites, oxidation of the hydrogen gas and reduction of ferric ions in the electrolyte is facilitated. The redox reactions occurring at the catalyst sites counteract loss of protons and ferrous ions in the electrolyte due to side reactions occurring during battery discharge.

At 1508, routine 1500 includes determining if a change in pH or a change in pressure in the electrolyte storage tank is detected. The change in pH may be an undesirable rise in pH. For example, the pH in the electrolyte may rise above a threshold pH, such as pH 2, prompting the controller to command adjustment of IFB operation. Alternatively, the change in pressure may be determined by the pressure transducer in the electrolyte storage tank to determine of hydrogen is accumulating in the electrolyte storage tank above a threshold pressure, indicating excess formation of hydrogen.

If a change in pH or a rise in tank pressure above the threshold is detected, the routine includes adjusting an amount of hydrogen injected into the electrolyte at 1510. Adjusting the amount of injected hydrogen may include increasing an amount of hydrogen delivered to the multi-stage rebalancing reactor to enhance a rate of hydrogen oxidation and thereby a rate of ferric ion reduction. As an example, the amount of delivered hydrogen may be increased by activating injection of hydrogen gas at additional injectors of the electrolyte circuit, when the electrolyte circuit is adapted with more than injector, as shown in FIGS. 11 and 13. Additionally or alternatively, the pump may be adjusted to pump electrolyte at a higher speed, thereby increasing flow of electrolyte and hydrogen gas to the reactor vessels of the multi-stage rebalancing reactor. The routine returns to 1504 to continue flowing electrolyte from the electrolyte storage tank to the multi-stage rebalancing reactor.

If the pH does not change or the tank pressure remains below the threshold at 1508, the routine determines if an imbalance in an electrolyte SOC is detected at 1512. The electrolyte SOC may inferred by comparing electrolyte concentration in a negative electrode compartment or in the negative electrolyte storage tank to electrolyte concentration in a positive electrode compartment or in the positive electrolyte storage tank. The imbalance may be detected, for example, by the tank pressure rising or a positive state of charging increasing faster than a negative state of charge.

If the imbalance in electrolyte SOC is detected at 1512, the routine continues to 1510 to adjust an amount of hydrogen injected into the electrolyte. Adjusting the amount of injected hydrogen includes increasing an amount of hydrogen delivered to the multi-stage rebalancing reactor to enhance a rate of hydrogen oxidation and thereby a rate of ferric ion reduction. As an example, the amount of delivered hydrogen may be increased by activating injection of hydrogen gas at additional injectors of the electrolyte circuit, when the electrolyte circuit is adapted with more than injector, as shown in FIGS. 11 and 13. Additionally or alternatively, the pump may be adjusted to pump electrolyte at a higher speed, thereby increasing flow of electrolyte and hydrogen gas to the reactor vessels of the multi-stage rebalancing reactor. The routine returns to 1504 to continue flowing electrolyte from the electrolyte storage tank to the multi-stage rebalancing reactor. If the imbalance in electrolyte SOC is not detected at 1512, the routine returns to the start.

In some examples, when the IFB system is adapted with more than one injectors and no increase pH and/or no imbalance in electrolyte SOC is detected, the rate of ferric ion reduction may be decreased by reducing a speed of the pump and/or by decreasing a number of actively operating injectors when the IFB system is adapted with more than one injectors and no increase in pH and/or no imbalance in electrolyte SOC is detected. An amount of hydrogen gas supplied to the multi-stage rebalancing reactor may thereby be adjusted according to a rebalancing demand via operation of the more than one injectors.

In this way, an efficiency of a rebalancing reactor of an IFB system may be increased. The rebalancing reactor may be a multi-stage rebalancing reactor incorporating multiple reactor vessels fluidly coupled to an electrolyte storage tank and to one another. Each of the reactor vessels may include a catalyst bed with a height maintained within a short height range. The catalyst bed of each of the reactor vessels may be positioned adjacent to an inlet of each of the reactor vessels and distal to an outlet of each of the reactor vessels. By maintaining the catalyst bed at a short height and arranging the catalyst bed immediately above the inlet of the each of the reactor vessels, coalescence of hydrogen bubbles is reduced within each of the reactor vessels. Oxidation of hydrogen gas and reduction of ferric ions is thus maintained at a high rate.

The technical effect of adapting the rebalancing reactor of the IFB system with the multi-stage rebalancing reactor is that battery output and cycling capacity is maintained high.

It will also be appreciated that the configurations and routines disclosed herein are exemplary in nature, and that these specific embodiments are not to be considered in a limiting sense, because numerous variations are possible. For example, the above technology may be applied to other flow battery types. The subject matter of the present disclosure includes all novel and nonobvious combinations and sub-combinations of the various systems and configurations, and other features, functions, and/or properties disclosed herein.

The disclosure also provides support for a redox flow battery system, comprising: an electrolyte storage tank configured to supply an electrolyte to a battery cell of the redox flow battery system and separate gas from the electrolyte, and a multi-stage rebalancing reactor fluidly coupled to the electrolyte storage tank, wherein each stage of the multi-stage rebalancing reactor is fluidly coupled to at least one adjacent stage and each stage is formed of one or more individually housed reactor vessels, the one or more reactor vessels spaced apart from other reactor vessels within a same stage, aligned with a vertical axis, and configured to facilitate reduction of an ion and oxidation of a gas. In a first example of the system, the system further comprises: a catalyst bed arranged in each respective vessel of the one or more reactor vessels, wherein a height of the catalyst bed is less than a height of the respective vessel. In a second example of the system, optionally including the first example, the system further comprises: an inlet at a bottom end of each vessel of the one or more reactor vessels, a distribution plate, and an outlet at an upper end of each vessel of the one or more reactor vessels, wherein the catalyst bed is positioned immediately above the inlet and distal from the outlet. In a third example of the system, optionally including the first and second examples, the system further comprises: a pump positioned downstream of the electrolyte storage tank and upstream of the multi-stage rebalancing reactor, wherein the pump is configured to flow the electrolyte from the electrolyte storage tank to at least one stage of the multi-stage rebalancing reactor. In a fourth example of the system, optionally including the first through third examples, the system further comprises: at least one injector positioned in a path of electrolyte flow between the electrolyte storage tank and the multi-stage rebalancing reactor, wherein the at least one injector is coupled to a gas line extending between a top of the electrolyte storage tank and the at least one injector, the gas line configured to siphon the gas from a head space of the electrolyte storage tank to the path of electrolyte flow. In a fifth example of the system, optionally including the first through fourth examples, the siphoned gas is mixed with the electrolyte upstream of the multi-stage rebalancing reactor and wherein a mixture of the gas and the electrolyte is delivered to each of the one or more reactor vessels.

The disclosure also provides support for a multi-stage rebalancing reactor, comprising: a plurality of reactor vessels configured to facilitate reduction of dissolved cations and oxidation of a gas at each vessel of the plurality of reactor vessels, the plurality of reactor vessels grouped into stages in a path of electrolyte flow, wherein an electrolyte flowing along the path of electrolyte flow is a mixture of the dissolved cations and the gas. In a first example of the system, each vessel of the plurality of reactor vessels includes an outer housing enclosing a catalyst bed, and wherein a height of the catalyst bed is 30-70% of a height of the outer housing. In a second example of the system, optionally including the first example, a central axis of each vessel of the plurality of reactor vessels is aligned parallel with a vertical axis and each respective vessel of the plurality of reactor vessels includes an inlet at a bottom of the respective vessel and an outlet at a top of the respective vessel, and wherein the catalyst bed is arranged within a lower region of the outer housing of each vessel of the plurality of reactor vessels, proximate to the inlet and spaced away from the outlet. In a third example of the system, optionally including the first and second examples, the catalyst bed is a jelly-roll catalyst bed formed of a stack of at least one catalyst layer, a substrate layer, and a spacing layer, coiled into a roll, and wherein the jelly-roll catalyst bed is positioned within the outer housing of each vessel of the plurality of reactor vessels with a central axis of the jelly-roll catalyst bed aligned with the central axis of each vessel of the plurality of reactor vessels. In a fourth example of the system, optionally including the first through third examples, the jelly-roll catalyst bed is configured to direct electrolyte flow along an outer surface of the jelly-roll catalyst bed and along inner surfaces through an inner region of the jelly-roll catalyst bed.

The disclosure also provides support for an all-iron flow battery, comprising: a rebalancing reactor formed of a plurality of reactor vessels, the plurality of reactor vessels grouped to form stages, and each vessel of the plurality of reactor vessels enclosing a catalyst bed, a pump driving electrolyte flow from an electrolyte tank to the rebalancing reactor, the electrolyte tank also fluidly coupled to a battery cell of the all-iron flow battery, and at least one gas line delivering gas from a head space of the electrolyte tank to the rebalancing reactor via at least one injector arranged upstream of the rebalancing reactor, wherein electrolyte is flowed to each vessel of the plurality of reactor vessels, the plurality of reactor vessels configured to chemically rebalance the electrolyte by reducing ferric ions and oxidizing hydrogen gas. In a first example of the system, each vessel of the plurality of reactor vessels is a separate, standalone structure, and wherein the plurality of reactor vessels is divided between at least a first stage and a second stage of the stages, the first stage arranged upstream of the second stage. In a second example of the system, optionally including the first example, each vessel in the first stage is not fluidly coupled to other vessels in the first stage and each vessel in the second stage is not fluidly coupled to other vessels in the second stage. In a third example of the system, optionally including the first and second examples, the vessels in the first stage are not fluidly coupled to the vessels in the second stage. In a fourth example of the system, optionally including the first through third examples, the plurality of reactor vessels is enclosed within a common outer housing and each vessel of the plurality of reactor vessels forms a stage of the stages. In a fifth example of the system, optionally including the first through fourth examples, the electrolyte delivered to the rebalancing reactor flows to each of the plurality of reactor vessels enclosed within the common outer housing. In a sixth example of the system, optionally including the first through fifth examples, at least a portion of the gas delivered via the at least one gas line is injected into the electrolyte upstream of the pump. In a seventh example of the system, optionally including the first through sixth examples, the at least one gas line is configured to simultaneously deliver the gas to more than one of the stages directly from the head space of the electrolyte tank by actively operating the at least one injector coupling the at least one gas line to the electrolyte flow upstream of the rebalancing reactor. In an eighth example of the system, optionally including the first through seventh examples, an amount of the gas delivered to the rebalancing reactor is increased when a speed of the pump is increased and/or a number of the at least one injector actively operating to inject the gas into the electrolyte flow is increased.

In an another representation, a method includes flowing electrolyte from an electrolyte storage tank to a multi-stage rebalancing reactor, the multi-stage rebalancing reactor having reactor vessels grouped into stages, and wherein the reactor vessels in a first stage of the stages are fluidly coupled to reactor vessels in a second, downstream stage of the stages, injecting hydrogen gas into the electrolyte upstream of the multi-stage rebalancing reactor via a gas line configured to siphon hydrogen gas from a head space of the electrolyte storage tank, and chemically reducing a metal ion of the electrolyte by oxidizing the hydrogen gas at a catalyst bed of each of the reactor vessels to maintain a charge balance of the electrolyte and a pH of the electrolyte within a predetermined range. In a first example of the method, flowing electrolyte includes operating a pump arranged downstream of the electrolyte storage tank and upstream of the multi-stage rebalancing reactor to drive the flow. A second example of the method optionally includes the first example and further includes, wherein flowing the electrolyte to the multi-stage rebalancing reactor includes flowing a mixture of hydrogen gas and electrolyte downstream of the pump and wherein the mixture of hydrogen gas and electrolyte is divided between the first stage and the second stage. A third example of the method optionally includes one or more of the first and second examples, and further includes, wherein injecting the hydrogen gas into the electrolyte includes injecting the hydrogen gas at each of the first stage and the second stage via one or more injectors arranged upstream of each of the first stage and the second stage. A fourth example of the method optionally includes one or more of the first through third examples, and further includes, responsive to a detected increase in electrolyte pH beyond a threshold amount, increasing an amount of hydrogen gas delivered to the multi-stage rebalancing reactor by one or more of increasing a speed of the pump and increasing a number of injectors injecting hydrogen into the electrolyte. A fifth example of the method optionally includes one or more of the first through fourth examples, and further includes, responsive to a detected imbalance in electrolyte state of charge, increasing an amount of hydrogen gas delivered to the multi-stage rebalancing reactor by one or more of increasing a speed of the pump and increasing a number of injectors injecting hydrogen into the electrolyte.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

This concludes the description. The reading of it by those skilled in the art would bring to mind many alterations and modifications without departing from the spirit and the scope of the description. For example, hybrid redox flow battery systems, all-iron hybrid redox flow battery systems, and other redox flow battery systems may all take advantage of the present description.

The invention claimed is:

1. A redox flow battery system, comprising:
an electrolyte storage tank configured to supply an electrolyte to a battery cell of the redox flow battery system and separate gas from the electrolyte; and
a multi-stage rebalancing reactor fluidly coupled to the electrolyte storage tank, wherein each stage of the multi-stage rebalancing reactor is fluidly coupled to at least one adjacent stage, and wherein each stage of the multi-stage rebalancing reactor is formed of multiple reactor vessels that are individually housed, wherein each of the multiple reactor vessels are spaced apart from other reactor vessels of the multiple reactor vessels within a same stage, aligned with a vertical axis, and configured to facilitate reduction of an ion and oxidation of a gas.

2. The redox flow battery system of claim 1, further comprising a catalyst bed arranged in each respective vessel of the multiple reactor vessels, wherein a height of the catalyst bed is less than a height of the respective vessel.

3. The redox flow battery system of claim 2, further comprising an inlet at a bottom end of each vessel of the multiple reactor vessels, a distribution plate, and an outlet at an upper end of each vessel of the multiple reactor vessels, wherein the catalyst bed is positioned immediately above the inlet and distal from the outlet.

4. The redox flow battery system of claim 1, further comprising a pump positioned downstream of the electrolyte storage tank and upstream of the multi-stage rebalancing reactor, wherein the pump is configured to flow the electrolyte from the electrolyte storage tank to at least one stage of the multi-stage rebalancing reactor.

5. The redox flow battery system of claim 4, further comprising at least one injector positioned in a path of electrolyte flow between the electrolyte storage tank and the multi-stage rebalancing reactor, wherein the at least one injector is coupled to a gas line extending between a top of the electrolyte storage tank and the at least one injector, the gas line configured to siphon the gas from a head space of the electrolyte storage tank to the path of electrolyte flow.

6. The redox flow battery system of claim 5, wherein the siphoned gas is mixed with the electrolyte upstream of the multi-stage rebalancing reactor and wherein a mixture of the gas and the electrolyte is delivered to each of the multiple reactor vessels.

7. A multi-stage rebalancing reactor, comprising:
a plurality of reactor vessels configured to facilitate reduction of dissolved cations and oxidation of a gas at each vessel of the plurality of reactor vessels, the plurality of reactor vessels grouped into stages in a path of electrolyte flow, wherein each of the stages comprises multiple reactor vessels of the plurality of reactor vessels, and wherein an electrolyte flowing along the path of electrolyte flow is a mixture of the dissolved cations and the gas.

8. The multi-stage rebalancing reactor of claim 7, wherein each vessel of the plurality of reactor vessels includes an outer housing enclosing a catalyst bed, and wherein a height of the catalyst bed is 30-70% of a height of the outer housing.

9. The multi-stage rebalancing reactor of claim 8, wherein a central axis of each vessel of the plurality of reactor vessels is aligned parallel with a vertical axis and each respective vessel of the plurality of reactor vessels includes an inlet at a bottom of the respective vessel and an outlet at a top of the respective vessel, and wherein the catalyst bed is arranged within a lower region of the outer housing of each vessel of the plurality of reactor vessels, proximate to the inlet and spaced away from the outlet.

10. The multi-stage rebalancing reactor of claim 9, wherein the catalyst bed is a jelly-roll catalyst bed formed of a stack of at least one catalyst layer, a substrate layer, and a spacing layer, coiled into a roll, and wherein the jelly-roll catalyst bed is positioned within the outer housing of each vessel of the plurality of reactor vessels with a central axis of the jelly-roll catalyst bed aligned with the central axis of each vessel of the plurality of reactor vessels.

11. The multi-stage rebalancing reactor of claim 10, wherein the jelly-roll catalyst bed is configured to direct electrolyte flow along an outer surface of the jelly-roll catalyst bed and along inner surfaces through an inner region of the jelly-roll catalyst bed.

12. An all-iron flow battery, comprising:
a rebalancing reactor formed of a plurality of reactor vessels, the plurality of reactor vessels grouped to form stages, wherein each of the stages comprises multiple reactor vessels of the plurality of reactor vessels, and wherein each vessel of the plurality of reactor vessels encloses a catalyst bed;
a pump driving electrolyte flow from an electrolyte tank to the rebalancing reactor, the electrolyte tank also fluidly coupled to a battery cell of the all-iron flow battery; and
at least one gas line delivering gas from a head space of the electrolyte tank to the rebalancing reactor via at least one injector arranged upstream of the rebalancing reactor;
wherein electrolyte is flowed to each vessel of the plurality of reactor vessels, the plurality of reactor vessels configured to chemically rebalance the electrolyte by reducing ferric ions and oxidizing hydrogen gas.

13. The all-iron flow battery of claim 12, wherein each vessel of the plurality of reactor vessels is a separate, standalone structure, and wherein the plurality of reactor vessels is divided between at least a first stage and a second stage of the stages, the first stage arranged upstream of the second stage.

14. The all-iron flow battery of claim 13, wherein each vessel in the first stage is not fluidly coupled to other vessels in the first stage and each vessel in the second stage is not fluidly coupled to other vessels in the second stage.

15. The all-iron flow battery of claim 14, wherein the vessels in the first stage are not fluidly coupled to the vessels in the second stage.

16. The all-iron flow battery of claim 12, wherein each of the plurality of reactor vessels is enclosed within a respective outer housing.

17. The all-iron flow battery of claim 12, wherein at least a portion of the gas delivered via the at least one gas line is injected into the electrolyte upstream of the pump.

18. The all-iron flow battery of claim 12, wherein the at least one gas line is configured to simultaneously deliver the gas to more than one of the stages directly from the head space of the electrolyte tank by actively operating the at least one injector coupling the at least one gas line to the electrolyte flow upstream of the rebalancing reactor.

19. The all-iron flow battery of claim 18, wherein an amount of the gas delivered to the rebalancing reactor is increased when a speed of the pump is increased and/or a number of the at least one injector actively operating to inject the gas into the electrolyte flow is increased.

20. The all-iron flow battery of claim 12, wherein a set of the multiple reactor vessels in a same stage are not fluidly to connected to each other.

* * * * *